US012725333B2

(12) United States Patent
Zhao et al.

(10) Patent No.: US 12,725,333 B2
(45) Date of Patent: Sep. 1, 2026

(54) METHODS AND SYSTEMS FOR PARAMETER IMAGING

(71) Applicant: SHANGHAI UNITED IMAGING HEALTHCARE CO., LTD., Shanghai (CN)

(72) Inventors: Yizhang Zhao, Shanghai (CN); Qing Ye, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 240 days.

(21) Appl. No.: 18/519,057

(22) Filed: Nov. 26, 2023

(65) Prior Publication Data

US 2024/0112379 A1 Apr. 4, 2024

Related U.S. Application Data

(63) Continuation of application No. PCT/CN2021/099887, filed on Jun. 11, 2021.

(51) Int. Cl.

*G06T 12/10* (2026.01)
*G06T 7/00* (2017.01)
*G06T 12/20* (2026.01)

(52) U.S. Cl.

CPC ............ *G06T 12/10* (2026.01); *G06T 7/0012* (2013.01); *G06T 12/20* (2026.01); *G06T 2207/10081* (2013.01); *G06T 2207/10104* (2013.01); *G06T 2211/424* (2013.01)

(58) Field of Classification Search

CPC ... G06T 11/005; G06T 7/0012; G06T 11/006; G06T 2207/10081; G06T 2207/10104; G06T 2211/424; A61B 6/032; A61B 6/481; A61B 6/5217; A61B 6/5241; A61B 6/037

See application file for complete search history.

(56) References Cited

U.S. PATENT DOCUMENTS 10,267,930 B2 * 4/2019 Su ........................ A61B 6/4488
10,534,097 B2 * 1/2020 Jiang ..................... G01T 1/2985
11,096,633 B1 * 8/2021 Qi .......................... A61B 6/483
(Continued)

FOREIGN PATENT DOCUMENTS

CN 107146218 A 9/2017
CN 108932741 A 12/2018
(Continued)

OTHER PUBLICATIONS

The Extended European Search Report in European Application No. 21944660.6 mailed on Mar. 25, 2024, 8 pages.
(Continued)

*Primary Examiner* — Tom Y Lu
(74) *Attorney, Agent, or Firm* — METIS IP LLC

(57) ABSTRACT

Embodiments of the present disclosure provide a method for parameter imaging. The method includes: obtaining two scan images of an object, wherein scanning ranges of the two scan images have an overlapping region; obtaining frame information by framing the two scan images or two sets of scan data corresponding to the two scan images, wherein the overlapping region in the two scan images corresponds to two frames; and determining metabolic information of a tracer inside the object based on the frame information.

20 Claims, 15 Drawing Sheets

(56) References Cited

U.S. PATENT DOCUMENTS

| | | | |
|---|---|---|---|
| 2008/0230703 | A1 | 9/2008 | Kadrmas et al. |
| 2012/0308106 | A1 | 12/2012 | Kelly et al. |
| 2015/0363948 | A1 | 12/2015 | Leahy et al. |
| 2017/0084025 | A1 | 3/2017 | Lyu |
| 2017/0103551 | A1 | 4/2017 | Sun et al. |
| 2018/0303438 | A1 | 10/2018 | Hu et al. |
| 2019/0059831 | A1 | 2/2019 | Hu et al. |
| 2020/0037975 | A1 | 2/2020 | Zhu et al. |
| 2021/0118202 | A1 | 4/2021 | Feng et al. |
| 2022/0012928 | A1 | 1/2022 | Andreyev et al. |

FOREIGN PATENT DOCUMENTS

| | | | |
|---|---|---|---|
| CN | 112052885 | A | 12/2020 |
| CN | 112365479 | A | 2/2021 |

OTHER PUBLICATIONS

Nicolas a Karakatsanis et al., Dynamic Whole-body PET Parametric Imaging: I. Concept, Acquisition Protocol Optimization and Clinical Application, Physics in Medicine & Biology, 58(20): 7391-7418, 2013.

Notice of Reasons for Rejection in Japanese Application No. 2023-575939 mailed on Aug. 5, 2024, 12 pages.

International Search Report in PCT/CN2021/099887 mailed on Mar. 9, 2022, 7 pages.

Written Opinion in PCT/CN2021/099887 mailed on Mar. 9, 2022, 10 pages.

Nicolas A. Karakatsanis et al., Continuous Bed Motion Vs. Step-and-Shoot Acquisition on Clinical Whole-Body Dynamic and Parametric PET Imaging, 2015 IEEE, 2015, 6 pages.

Arman Rahmim et al., Dynamic Whole-Body PET Imaging: Principles, Potentials and Applications, European Journal of Nuclear Medicine and Molecular imaging, 501-518, 2019.

Ye, Qing et al., Step-and-Shoot Dynamic Whole-Body PET Parametric Imaging with Weighted Expectation Maximization Algorithm, 2 pages.

Nicolas A Karakatsanis et.al., Whole-body direct 4D parametric PET imaging employing nested generalized Patlak expectation-maximization reconstruction, Physics in Medicine & Biology, 61(2016): 5456-5485, 2016.

Ye, Qing et al., Dynamic Fdg Pet imaging with static scan protocols, Chinese Medical Equipment Journal, 40(2): 1-5, 2019.

* cited by examiner

METHODS AND SYSTEMS FOR PARAMETER IMAGING

CROSS-REFERENCE TO RELATED APPLICATIONS

This application is a Continuation of International Application No. PCT/CN2021/099887, filed on Jun. 11, 2021, the entire contents of which are hereby incorporated by reference.

TECHNICAL FIELD

The present disclosure primarily relates to systems and methods for image reconstruction, specifically relating to systems and methods for reconstructing parameter images.

BACKGROUND

In recent years, Positron Emission Tomography (PET) imaging has been widely used in clinical examinations and disease diagnosis. Compared to Standardized Uptake Value (SUV) imaging techniques, parameter imaging techniques can provide quantification results with higher accuracy. For example, the parameter imaging techniques can perform dynamic analysis of tracer uptake by applying kinetic modeling to each individual voxel.

Dynamic PET imaging, as opposed to static PET imaging, can provide a set of images during a dynamic scan period. In the case of multi-bed stepwise whole-body dynamic PET scanning, there is typically an overlap in scanning regions of adjacent bed positions, which is used to enhance sensitivity in recovering edges of the scanning regions. In traditional approaches, the overlapping region of reconstructed images obtained from the adjacent bed positions are often merged into one frame for pharmacokinetic analysis. However, in situations where a frame duration is long or an activity concentration changes rapidly, an activity variation in the overlapping region between two bed scans may not be ignored. Therefore, there is a need for a method and a system for parameter imaging that employs different analysis approaches for the overlapping and non-overlapping regions to improve the accuracy of subsequent parameter imaging.

Furthermore, during a nonlinear fitting and solving process of a kinetic model for the parameter imaging, certain parameters having physiological significance may be determined as values that do not conform to a physiological property. For example, a blood volume fraction ($V_b$) in a region of interest may be determined as a negative value. Therefore, there is a need for the method and the system for parameter imaging that can impose boundaries on the process of nonlinear solving of the parameters, thereby making the computed kinetic parameters closer to their true values.

SUMMARY

The first aspect of the present disclosure provides a method for parameter imaging, including: obtaining two scan images of an object, wherein scanning ranges of the two scan images have an overlapping region; obtaining frame information by framing the two scan images or two sets of scan data corresponding to the two scan images, wherein the overlapping region in the two scan images corresponds to two frames; and determining metabolic information of a tracer inside the object based on the frame information.

In some embodiments, time information of the two sets of scan data corresponding to the two scan images may be different.

In some embodiments, the obtaining two scan images of an object may include: performing scanning on the object at adjacent two bed positions to obtain the two scan images.

In some embodiments, the obtaining frame information by framing the two scan images or two sets of scan data corresponding to the two scan images may include: for each scan image of the two scan images, dividing the each scan image into the overlapping region and a non-overlapping region; determining a time point corresponding to the overlapping region and a time point corresponding to the non-overlapping region; designating a sub-image that corresponds to the overlapping region in the each scan image and the time point corresponding to the overlapping region as information of a frame of the two frames; and designating a sub-image that corresponds to the non-overlapping region in the each scan image and the time point corresponding to the non-overlapping region as information of another frame of the two frames.

In some embodiments, the determining a time point corresponding to the overlapping region and a time point corresponding to the non-overlapping region may include: determining time points corresponding to the each scan image based on a start scan time and an end scan time of the each scan image; and determining the time points corresponding to the each scan image as the time point corresponding to the overlapping region and the time point corresponding to the non-overlapping region.

In some embodiments, the frame information may further include weights of the two frames corresponding to the overlapping region in the two scan images, and the two scan images may include a first scan image and a second scan image, and obtaining the frame information may include: determining the weight of a first frame corresponding to the overlapping region in the first scan image based on position information of the overlapping region in the first scan image; and determining the weight of a second frame corresponding to the overlapping region in the second scan image based on position information of the overlapping region in the second scan image.

In some embodiments, the weights may be expressed by a weight matrix, and each weight value in the weight matrix may correspond to a pixel in a corresponding frame of the overlapping region.

In some embodiments, the weight value in the weight matrix may be related to at least one of: a distance along a direction of movement of a scanning bed between the pixel in the corresponding frame of the overlapping region and a central position of a scanning device; or a scanning time of the corresponding frame.

In some embodiments, the determining metabolic information of a tracer inside the object based on the frame information may include: determining values of one or more kinetic parameters based on the frame information to directly or indirectly reconstruct a parameter image, wherein the one or more kinetic parameters may be related to a determination of the metabolic information of the tracer inside the object.

In some embodiments, the determining values of one or more kinetic parameters based on the frame information may include: determining the values of the one or more kinetic parameters using a weighted iterative algorithm based on the frame information and a kinetic model.

In some embodiments, the determining the values of the one or more kinetic parameters using a weighted iterative algorithm based on the frame information and a kinetic model may include: determining the values of the one or more kinetic parameters using a weighted expectation-maximization algorithm based on the frame information and the kinetic model.

In some embodiments, the kinetic model may include a compartmental model or a retention model.

In some embodiments, the two scan images may be obtained by at least one of a computed tomography (CT) device, a magnetic resonance imaging (MRI) device, a positron emission tomography (PET) device, or a single photon emission computed tomography (SPECT) device.

In some embodiments, the determining values of one or more kinetic parameters based on the frame information may include: using a bounded function to replace at least one of the one or more kinetic parameters in a kinetic model based on physiological significance of the at least one of the one or more kinetic parameters; and determining the values of the one or more kinetic parameters by solving for values of the bounded function in the kinetic model.

The second aspect of the present disclosure provides a method for parameter imaging, including: obtaining two sets of scan data of an object by performing scanning on the object at adjacent two bed positions, wherein scanning ranges of two scan images correspond to the two sets of scan data have an overlapping region; obtaining frame information by framing the two sets of scan data or the two scan images, wherein the overlapping region in the two scan images corresponds to two frames; and determining metabolic information of a tracer inside the object based on the frame information.

The third aspect of the present disclosure provides a method for parameter imaging, including: obtaining scan data of an object; obtaining a kinetic model, wherein the kinetic model characterizes a kinetic property of a tracer inside the object through one or more kinetic parameters, and the one or more kinetic parameters indicate metabolic information of the tracer inside the object; using a bounded function to replace at least one of the one or more kinetic parameters in the kinetic model based on physiological significance of the at least one of the one or more kinetic parameters; and determining values of the one or more kinetic parameters by solving for values of the bounded function in the kinetic model based on the scan data.

In some embodiments, the using a bounded function to replace at least one of the one or more kinetic parameters in the kinetic model based on physiological significance of the at least one of the one or more kinetic parameters may include: determining a preset range of the at least one of the one or more kinetic parameters based on the physiological significance of the at least one of the one or more kinetic parameters; and selecting, based on the preset range, the bounded function for replacing the at least one of the one or more kinetic parameters in the kinetic model.

In some embodiments, the one or more kinetic parameters may include a plurality of kinetic parameters, and the using a bounded function to replace at least one of the one or more kinetic parameters in the kinetic model based on physiological significance of the at least one of the one or more kinetic parameters may include: selecting a target kinetic parameter from the plurality of kinetic parameters; and using the bounded function to replace the target kinetic parameter.

In some embodiments, the one or more kinetic parameters may include a plurality of kinetic parameters, and the using a bounded function to replace the at least one of the one or more kinetic parameters in the kinetic model based on physiological significance of the at least one of the one or more kinetic parameters may include: determining values of the plurality of kinetic parameters by solving the kinetic model based on the scan data; determining if there is a value of the plurality of kinetic parameters that exceeds a preset range; and in response to determining that there is the value of the plurality of kinetic parameters that exceeds the preset range, using the bounded function to replace the at least one of the one or more kinetic parameters.

In some embodiments, the determining values of the one or more kinetic parameters by solving for values of the bounded function in the kinetic model based on the scan data may include: determining a value of the bounded function in the kinetic model using a fitting algorithm based on the scan data; and designating the value of the bounded functions as the value of the at least one of the one or more kinetic parameters.

In some embodiments, the kinetic model may include a compartmental model or a retention model.

In some embodiments, the bounded function may include at least one of an absolute value function, a square function, an exponential function, or an arctangent function.

In some embodiments, the scan data may be obtained by at least one of a computed tomography (CT) device, a magnetic resonance imaging (MRI) device, a positron emission tomography (PET) device, or a single photon emission computed tomography (SPECT) device.

In some embodiments, the obtaining scan data of the object may include: obtaining the scan data by performing multi-bed stepwise scanning or continuous bed motion (CBM) scanning on the object.

In some embodiments, the method may further include: directly or indirectly reconstructing a parameter image based on the scan data and the values of the one or more kinetic parameters.

The fourth aspect of the present disclosure provides a parameter imaging system, including: at least one storage device, configured to store an instruction set; and at least one processor in communication with the at least one storage device. When executing the instruction set, the at least one processor is configured to cause the system to: obtain two scan images of an object, wherein scanning ranges of the two scan images have an overlapping region; obtain frame information by framing the two scan images or two sets of scan data corresponding to the two scan images, wherein the overlapping region in the two scan images corresponds to two frames; and determine metabolic information of a tracer inside the object based on the frame information.

The fifth aspect of the present disclosure provides a parameter imaging system, including: at least one storage device, configured to store an instruction set; and at least one processor in communication with the at least one storage device. When executing the instruction set, the at least one processor is configured to cause the system to: obtain two sets of scan data of an object by performing scanning on the object at adjacent two bed positions, wherein scanning ranges of two scan images correspond to the two sets of scan data have an overlapping region; obtain frame information by framing the two sets of scan data or the two scan images, wherein the overlapping region in the two scan images corresponds to two frames; and determine metabolic information of a tracer inside the object based on the frame information.

The sixth aspect of the present disclosure provides a parameter imaging system, including: at least one storage device, configured to store an instruction set; and at least one processor in communication with the at least one storage device. When executing the instruction set, the at least one processor is configured to cause the system to: obtain scan data of an object; obtain a kinetic model, wherein the kinetic model characterizes a kinetic property of a tracer inside the object through one or more kinetic parameters, and the one or more kinetic parameters indicate metabolic information of the tracer inside the object; use a bounded function to replace at least one of the one or more kinetic parameters in the kinetic model based on physiological significance of the at least one of the one or more kinetic parameters; and determine values of the one or more kinetic parameters by solving for values of the bounded function in the kinetic model based on the scan data.

The seventh aspect of the present disclosure provides a non-transitory computer-readable storage medium which includes at least one instruction set. When executed by at least one processor of a computing device, the at least one instruction set causes the at least one processor to implement a method, including: obtaining two scan images of an object, wherein scanning ranges of the two scan images have an overlapping region; obtaining frame information by framing the two scan images or two sets of scan data corresponding to the two scan images, wherein the overlapping region in the two scan images corresponds to two frames; and determining metabolic information of a tracer inside the object based on the frame information.

The eighth aspect of the present disclosure provides a non-transitory computer-readable storage medium which includes at least one instruction set. When executed by at least one processor of a computing device, the at least one instruction set causes the at least one processor to implement a method, including: obtaining two sets of scan data of an object by performing scanning on the object at adjacent two bed positions, wherein scanning ranges of two scan images correspond to the two sets of scan data have an overlapping region; obtaining frame information by framing the two sets of scan data or the two scan images, wherein the overlapping region in the two scan images corresponds to two frames; and determining metabolic information of a tracer inside the object based on the frame information.

The ninth aspect of the present disclosure provides a non-transitory computer-readable storage medium which includes at least one instruction set. When executed by at least one processor of a computing device, the at least one instruction set causes the at least one processor to implement a method, including: obtaining scan data of an object; obtaining a kinetic model, wherein the kinetic model characterizes a kinetic property of a tracer inside the object through one or more kinetic parameters, and the one or more kinetic parameters indicate metabolic information of the tracer inside the object; using a bounded function to replace at least one of the one or more kinetic parameters in the kinetic model based on physiological significance of the at least one of the one or more kinetic parameters; and determining values of the one or more kinetic parameters by solving for values of the bounded function in the kinetic model based on the scan data.

Some additional features of the present disclosure may be explained in the following description. Through study of the following description and corresponding drawings or through an understanding of the production or operation of the embodiments, these additional features of the present disclosure may be apparent to those skilled in the art. The features of the present disclosure may be achieved and realized by the practice or use of methods, means, and combinations of various aspects of specific embodiments described in the following description.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

In order to provide a clearer understanding of the technical solutions of the embodiments described in the present disclosure, a brief introduction to the drawings required for the description of the embodiments is provided below. However, those skilled in the art should understand that the embodiments may be implemented without these details. In other cases, to avoid unnecessarily complicating various aspects of the present disclosure, well-known methods, processes, systems, components, and/or circuits have been described at a higher level. It is evident to those skilled in the art that various changes may be made to the disclosed embodiments, and the general principles defined in the present disclosure may be applied to other embodiments and application scenarios without departing from the principles and scope of the present disclosure. Therefore, the present disclosure is not limited to the illustrated embodiments but is in accordance with the broadest scope consistent with the scope of the present disclosure.

The terms used in the present disclosure are for the purpose of describing specific exemplary embodiments and are not restrictive. The singular forms “a,” “an,” and “the” may include plural forms unless the context clearly indicates otherwise. It should also be understood that the terms “comprise” and “include” are used herein to specify the presence of the stated features, integers, steps, operations, components, and/or elements but do not preclude the presence or addition of one or more other features, integers, steps, operations, components, elements, and/or their combinations.

It should be understood that the terms “system,” “engine,” “unit,” “module,” and/or “block” used herein are ways for distinguishing different components, elements, parts, or units at different levels in ascending order. However, if the same purpose may be achieved, these terms may also be replaced by other expressions.

Figure 2:
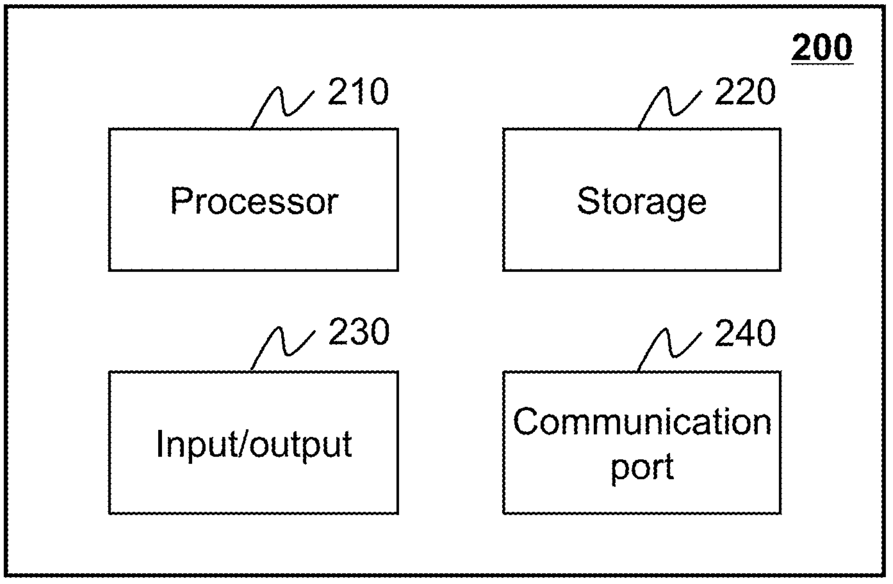
FIG. 2 is a schematic diagram of at least a portion of an exemplary computing device that may implement a medical system 100 according to some embodiments of the present disclosure.

Generally, the terms “module,” “unit,” or “block” used here refer to logic embodied in hardware or firmware or a collection of software instructions. The modules, units, or blocks described in the present disclosure may be implemented as software and/or hardware and may be stored in any type of non-transitory computer-readable medium or other storage device. In some embodiments, the software modules/units/blocks may be compiled and linked into executable programs. It may be appreciated that the software modules may be callable from other modules/units/blocks or call themselves and/or may respond to detected events or interrupts. The software modules/units/blocks configured to be executed on a computing device (e.g., a processor 210 as shown in FIG. 2) may be provided on computer-readable media. For example, optical discs, digital video discs, flash drives, disks, or any other tangible medium or as a digital download (and initially stored in a compressed or installable format that needs to be installed, decompressed, or decrypted before execution). The software code described here may be partially or entirely stored on the storage device of the computing device that performs the operation. Software instructions may be embedded in the firmware. It should also be understood that hardware modules/units/blocks may include logical components such as gates and flip-flops, and/or may include programmable units such as programmable gate arrays or processors. The functions of the modules/units/blocks or computing device described in the present disclosure may be implemented as software modules/units/blocks, but may also be represented as hardware or firmware. Typically, the modules/units/blocks described here refer to logical modules/units/blocks, which may be combined with other modules/units/blocks or divided into submodules/subunits/subblocks, even though they are physically organized or stored devices. This description may apply to systems, engines, or parts thereof.

It should be understood that, unless explicitly stated otherwise in the context, when a unit, engine, module, or block is referred to as being “on,” “connected to,” or “coupled to” another unit, engine, module, or block, it may be directly on, connected to, or coupled to another unit, engine, module, or block, or there may be an intermediate unit, engine, module, or block. In the present disclosure, the term “and/or” may include any one or more of the listed items or combinations thereof.

The functions and operations of these and other features, characteristics, and related structural elements of the present disclosure, as well as component combinations and manufacturing economy, may become more apparent from the following description of the drawings, and these drawings constitute part of the present disclosure. However, it should be understood that the drawings are provided for illustrative and descriptive purposes and are not intended to limit the scope of the present disclosure. It should also be understood that the drawings are not drawn to scale.

The flowcharts used in the present disclosure depict steps performed by a system according to some embodiments disclosed in the present disclosure. It should be understood that the operations in the flowcharts may not be executed in the order shown. Instead, they may be executed in reverse order or simultaneously handle various steps. Additionally, one or more other steps may be added to these flowcharts, or one or more steps may be removed from the flowcharts.

Dynamic PET imaging can provide tracer distribution images at continuous time points, revealing temporal changes in tracer activity. By applying a kinetic model to dynamic PET images in post-processing, a functional parameter of a tissue organ, such as local blood flow, metabolic rate, and substance transport rate, may be further obtained, providing a description of a metabolic functional state within a patient’s body at a molecular level.

In a multi-bed stepwise whole-body PET scanning mode, scanning regions of adjacent bed positions typically have an overlapping region, which is used to restore sensitivity of edges of the scanning regions. In static whole-body PET scanning, it is usually assumed that the tracer activity remains essentially constant during an acquisition time, and a weighted summation is used to generate a whole-body PET image. In dynamic whole-body PET scanning, the overlapping region of reconstructed images of the adjacent bed positions are typically merged into one frame for pharmacokinetic analysis. A frame duration is calculated by weighting scan times of the adjacent bed positions. However, since this approach does not consider activity changes of the tracer between the two bed scans, it may lead to significant errors in the parameter image of the overlapping region.

One aspect of the present disclosure primarily provides a method for parameter imaging. The method may include obtaining a plurality of sets of scan data of an object by performing a plurality of bed scans on the object. Scanning ranges of two scan images that corresponds to two sets of scan data obtained from two adjacent bed scans have an overlapping region. The method may also include framing the plurality of sets of scan data to obtain information of a series of frames. The overlapping region between the two scan images corresponding to the two sets of scan data obtained from the two adjacent bed scans corresponds to two frames in the two scan images. The method may further include determining metabolism information of a tracer inside the object based on the information of the series of frames.

According to some embodiments of the present disclosure, by employing different analysis approaches for the overlapping region and a non-overlapping region to directly or indirectly reconstruct parameter image based on a pharmacokinetic model, accuracy of the parameter image of the overlapping region can be improved. Specifically, the overlapping region may be considered as two frames for pharmacokinetic analysis between adjacent two bed scans, taking into account the changes in the tracer activity between the two frames in the adjacent two bed scans, which better represents actual physiological changes. This approach yields a higher-quality parameter image, especially when the frame duration is long or the tracer activity changes rapidly. Furthermore, weights may be introduced into the pharmacokinetic analysis to account for different noise levels in the overlapping region in the two adjacent bed scans, further enhancing the accuracy of parameter image.

A compartment model has been widely used in dynamic PET quantitative analysis. A kinetic parameter of the compartment model (e.g., a two-compartment model) may be obtained from a nonlinear regression of a time-activity curve (TAC) of the tracer. A Levenberg-Marquardt (LM) algorithm is commonly used to solve the least squares problem in nonlinear compartment model analysis. However, the LM algorithm is unrestricted in terms of a fitting parameter boundary, which may lead to a meaningless result. For example, a blood volume fraction ($V_b$) in a region of interest may be solved as a negative value, which does not conform to a physiological property. Therefore, it is necessary to constrain the nonlinear solving process (e.g., by bounding the parameter boundary) to make a calculated result closer to a true value. One traditional approach may be to enforce a boundary constraint on the kinetic parameter during iterations, but this approach may easily lead to a fitting result getting stuck in a local optimum. Another traditional approach may be to post-process a calculated kinetic parameter that falls outside a preset range, for example, modifying the negative value of $V_b$ to 0, but this approach leads to an inaccurate result.

Another aspect of the present disclosure primarily provides a method for parameter imaging. The method may include obtaining scan data of an object. The method may further include obtaining a kinetic model that characterizes a kinetic property of a tracer inside the object through one or more kinetic parameters, which indicate metabolic information of the tracer inside the object. The method may also include using a bounded function to replace at least one of the one or more kinetic parameters in the kinetic model based on physiological significance of the one or more kinetic parameters. The method may further include determining the values of the one or more kinetic parameters by determining a value of the bounded function in the kinetic model based on the scan data.

According to some embodiments of the present disclosure, by replacing the bounded function for the one or more kinetic parameters that need boundary constraints during a fitting process, the parameter boundary constraints are achieved through a characteristic of the bounded function rather than through enforced boundary constraints during iterations. This ensures that parameter fitting remains within a reasonable range while yielding a result that is closer to a true value.

Figure 1:
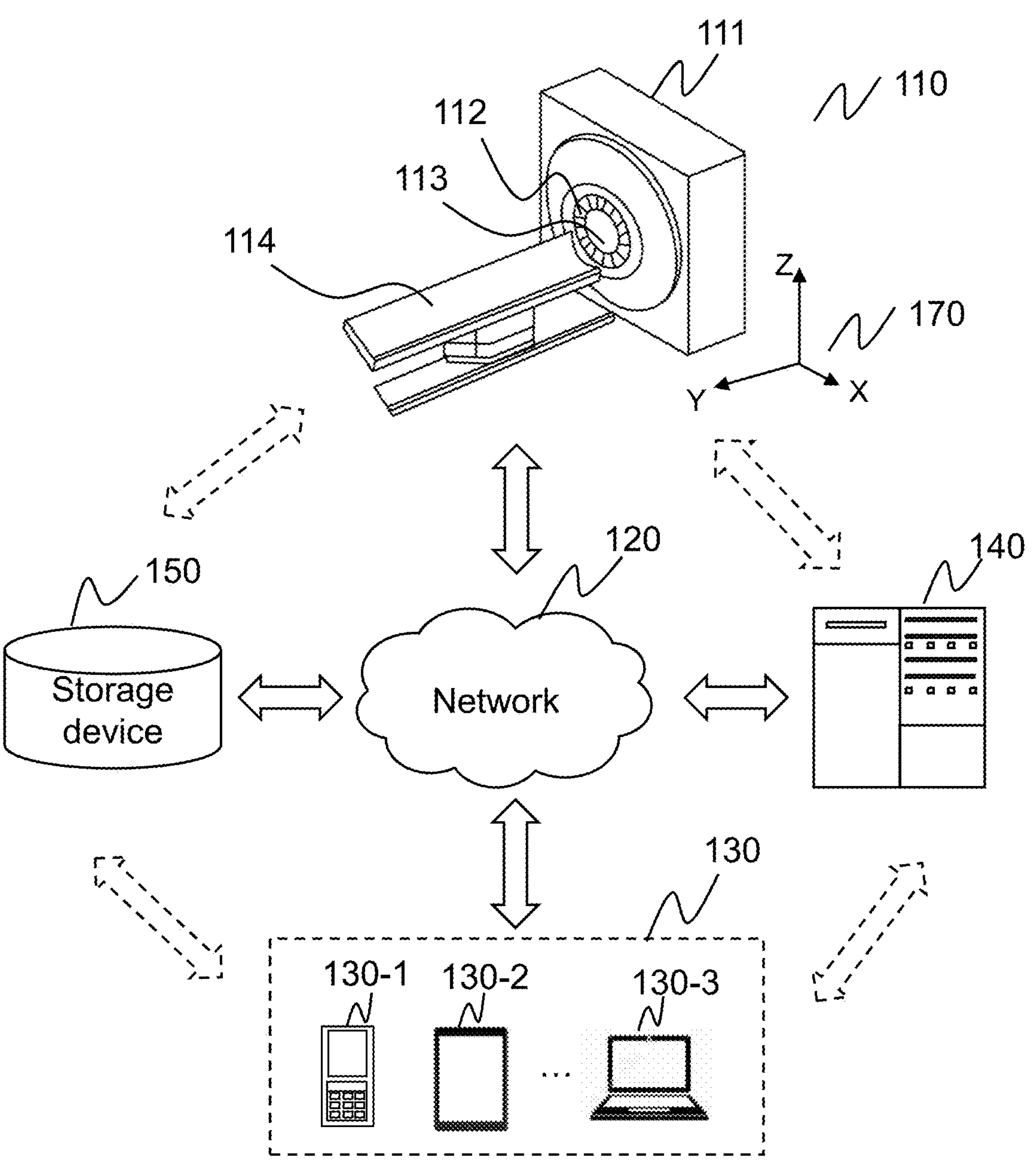
FIG. 1 is a schematic diagram of an exemplary medical system according to some embodiments of the present disclosure.

FIG. 1 is a schematic diagram of an exemplary medical system according to some embodiments of the present disclosure. A medical system 100 may include a medical device 110, a network 120, one or more terminals 130, a processing device 140, and a storage device 150. Components of the medical system 100 may be connected in various ways. Merely by way of example, the medical device 110 may be connected to the processing device 140 directly (as indicated by the dashed line bidirectional arrow connecting the medical device 110 and the processing device 140) or through the network 120. Merely by way of another example, the storage device 150 may be connected to the medical device 110 directly (as indicated by the dashed bidirectional arrow connecting the storage device 150 and the medical device 110) or through the network 120. Merely by way of yet another example, the one or more terminals 130 may be connected to the processing device 140 directly (as indicated by the dashed line bidirectional arrow connecting one or more terminals 130 and the processing device 140) or through the network 120. Merely by way of still yet another example, the one or more terminals 130 may be connected to the storage device 150 directly (as indicated by the dashed line bidirectional arrow connecting the one or more terminals 130 and the storage device 150) or through the network 120.

The medical device 110 may perform at least one of imaging or treatment on an object. In some embodiments, the object may include at least one of a biological or a non-biological object. For example, the object may include a specific part of a human body, such as the head, chest, abdomen, or a combination thereof. As another example, the object may be a patient to be scanned by the medical device 110.

In some embodiments, the medical device 110 may scan the object to obtain data related to the object. For example, the medical device 110 may include at least one of a single-modality scanning device or a multi-modality scanning device. The single-modality scanning device may include an emission computed tomography (ECT) device, a positron emission tomography (PET) device, a single-photon emission computed tomography (SPECT) device, an ultrasound device, an X-ray device, a computed tomography (CT) device, a magnetic resonance imaging (MRI) device, or any combination thereof. The multi-modality scanning device may include an X-ray imaging-MRI (X-ray-MRI) scanning device, a PET-X-ray scanning device, a SPECT-MRI scanning device, a PET-CT scanning device, a PET-MRI scanning device, a digital subtraction angiography-MRI (DSA-MRI) scanning device, etc. The provided scanning devices above are for illustrative purposes and do not intend to limit the scope of the present disclosure. As used in the present disclosure, the terms "imaging modality" or "modality" broadly refer to at least one of imaging approaches or techniques for collecting, generating, processing, or analyzing imaging information of a target object.

In some embodiments, the medical device 110 may be a PET device, including a gantry 111, a detector 112, a scanning region 113, and a scanning bed 114. The gantry 111 may support the detector 112. The object may be placed on the scanning bed 114 and moved into the scanning region 113 for scanning as the scanning bed 114 moves. In some embodiments, the detector 112 may include one or more detector units. The detector 112 may include a scintillation detector (e.g., a cesium iodide detector), a gas detector, or the like. The detector 112 may include at least one of single-row detectors or multi-row detectors, wherein a plurality of detector units are arranged in a single row in the single-row detectors and a plurality of detector units are arranged in a plurality of rows in the multi-row detectors.

The network 120 may include any suitable network that facilitates exchange of at least one of information or data within the medical system 100. In some embodiments, one or more components (e.g., the medical device 110, the one or more terminals 130, the processing device 140, and the storage device 150) of the medical system 100 may communicate at least one of information or data with one or more other components of the medical system 100 via the network 120. For example, the processing device 140 may obtain scan data from the medical device 110 through the network 120. As another example, the processing device 140 may receive a user instruction from the one or more terminals 130 through the network 120. The network 120 may include at least one of a public network (e.g., the internet), a private network (e.g., a local area network (LAN), a wide area network (WAN)), a wired network (e.g., an Ethernet), a wireless network (e.g., a 802.11 network, a Wi-Fi network), a cellular network (e.g., a Long-Term Evolution (LTE) network), a frame relay network, a virtual private network (VPN), a satellite network, a telephone network, a router, a hub, a switch, a server computer, or any combination thereof. For example, the network 120 may include a cable network, a wired network, a fiber optic network, a telecommunications network, an intranet, a wireless LAN (WLAN), a metropolitan area network (MAN), a public switched telephone network (PSTN), a Bluetooth™ network, a ZigBee™ network, a Near Field Communication (NFC) network, or any combination thereof. In some embodiments, the network 120 may include one or more network access points. For example, the network 120 may include at least one of a wired or a wireless network access point such as at least one of a base station or an internet exchange point. One or more components of the medical system 100 may be connected to the network 120 through at least one of the wired or the wireless access point to exchange at least one of data or information.

Figure 3:
FIG. 3 is a schematic diagram of at least one of exemplary hardware or software components of a mobile device that may implement a terminal according to some embodiments of the present disclosure.
Figure 3:
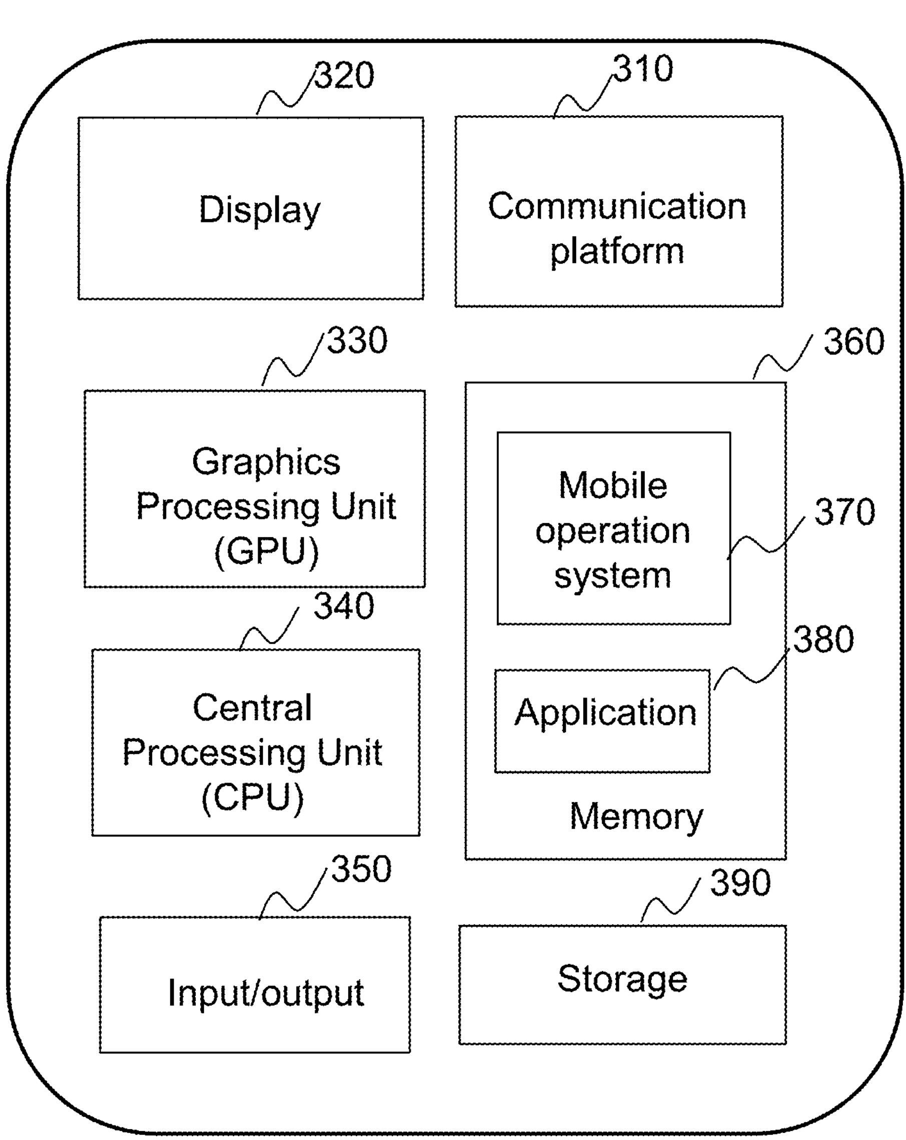

The one or more terminals 130 may include a mobile device 131, a tablet computer 132, a laptop 133, or any combination thereof. In some embodiments, the mobile device 131 may include a smart home device, a wearable device, a smart mobile device, a virtual reality device, an augmented reality device, or any combination thereof. Merely by way of example, the one or more terminals 130 may include the mobile device as shown in FIG. 3. In some embodiments, the smart home device may include a smart lighting device, a smart appliance control device, a smart monitoring device, a smart television, a smart camera, an intercom, or any combination thereof. In some embodiments, the wearable device may include a bracelet, a shoe, a pair of glasses, a helmet, a watch, a piece of clothing, a backpack, a smart accessory, or any combination thereof. In some embodiments, the mobile device may include a mobile phone, a personal digital assistant (PDA), a gaming device, a navigation device, a point of sale (POS) device, a laptop, a tablet computer, a desktop computer, or any combination thereof. In some embodiments, at least one of the virtual reality device or the augmented reality device may include a virtual reality headset, a virtual reality glass, a virtual reality visor, an augmented reality headset, an augmented reality glass, an augmented reality visor, or any combination thereof. For example, the at least one of the virtual reality device or the augmented reality device may include Google Glass™, Oculus Rift™, Hololens™, Gear VR™, or the like. In some embodiments, the one or more terminal 130 may be part of the processing device 140.

The processing device 140 may process at least one of data or information obtained by at least one of the medical device 110, the one or more terminal 130, or the storage device 150. For example, the processing device 140 may obtain a set or a plurality of sets of scan data of an object. As another example, the processing device 140 may obtain information of a series of frames by framing the plurality of sets of scan data. As yet another example, the processing device 140 may determine metabolic information of a tracer inside an object based on the information of the series of frames. As still another example, the processing device 140 may use a bounded function to replace at least one of one or more kinetic parameters in a kinetic model, based on physiological significance of the one or more kinetic parameters. As still yet another example, the processing device 140 may determine values of the one or more kinetic parameters by solving for values of the bounded function in the kinetic model based on the scan data. In some embodiments, the processing device 140 may be a single server or a server group. The server group may be centralized or distributed. In some embodiments, the processing device 140 may be a local component or a remote component relative to one or more other components of the medical system 100. For example, the processing device 140 may access at least one of information or data stored in at least one of the medical device 110, the one or more terminals 130, or the storage device 150 through the network 120. As another example, the processing device 140 may be directly connect to at least one of the medical device 110, the one or more terminals 130, or the storage device 150 to access the at least one of stored information or data. In some embodiments, the processing device 140 may be implemented on a cloud platform. Merely by way of example, the cloud platform may include a private cloud, a public cloud, a hybrid cloud, a community cloud, a distributed cloud, an internal cloud, a multi-layer cloud, or any combination thereof. In some embodiments, the processing device 140 may be implemented by a computing device 200 having one or more components as shown in FIG. 2.

The storage device 150 may store at least one of data, instructions, or any other information. In some embodiments, the storage device 150 may store at least one of data obtained from the one or more terminals 130/or instructions that the processing device 140 may execute or use to execute exemplary methods described in the present disclosure. The storage device 150 may include a high-capacity storage, a removable storage, a volatile read-write memory, a read-only memory (ROM), or any combination thereof. Exemplary high-capacity storage may include a disk, an optical disc, a solid-state drive, or the like. Exemplary removable storage may include a flash drive, a floppy disk, an optical disc, a memory card, a zip drive, a tape, and the like. Exemplary volatile read-write memory may include random-access memory (RAM). Exemplary RAM may include dynamic random-access memory (DRAM), double data rate synchronous dynamic random-access memory (DDR SDRAM), static random-access memory (SRAM), thyristor random-access memory (T-RAM), zero-capacitor random-access memory (Z-RAM), etc. Exemplary ROM may include mask ROM (MROM), programmable ROM (PROM), erasable programmable ROM (EPROM), electrically erasable programmable ROM (EEPROM), compact disc ROM (CD-ROM), digital versatile disc ROM (DVD-ROM), digital multi-functional disc ROM, etc. In some embodiments, the storage device 150 may be implemented on the cloud platform. Merely by way of example, the cloud platform may include the private cloud, the public cloud, the hybrid cloud, the community cloud, the distributed cloud, the internal cloud, the multi-layer cloud, or any combination thereof.

In some embodiments, the storage device 150 may be connected to the network 120 to communicate with one or more other components (e.g., the processing device 140, the one or more terminals 130) of the medical system 100. One or more components of medical system 100 may access data or instructions stored in the storage device 150 through the network 120. In some embodiments, the storage device 150 may be directly connected to or communicate with the one or more other components (e.g., the processing device 140, the one or more terminals 130) of the medical system 100. In some embodiments, the storage device 150 may be part of the processing device 140.

In some embodiments, the medical system 100 may provide a coordinate system 170 for the medical device 110 to define at least one of positions (e.g., absolute position, relative position to another component) of components of the medical device 110 or motion of the components. For example, the coordinate system 170 may include an X-axis, a Y-axis, and a Z-axis. The X-axis and Y-axis are axes in a horizontal direction, and the Z-axis is an axis in a vertical direction. As shown in FIG. 1, a positive direction of the X-axis may be a direction from a left side to a right side of a treatment bed when facing a front of the medical device 110. A positive direction of the Y-axis may be a direction along which the treatment bed moves from an inside to an outside of the medical device 110. A positive direction of the Z-axis may be a direction from below the medical device 110 (or the ground on which the medical device 110 is located) toward a top of the medical device 110. The coordinate system 170 is provided for illustrative purposes only, for example, the coordinate system 170 may include other coordinate axes. As another example, the directions of the X-axis, Y-axis, and Z-axis may be other directions, and the present disclosure does not impose restrictions.

It should be noted that the above description is provided for illustrative purposes only and is not intended to limit the scope of the present disclosure. Those skilled in the art may make various changes and modifications within the scope of the present disclosure. Features, structures, methods, and other features of exemplary embodiments described in the present disclosure may be combined in various ways to obtain at least one of additional or alternative exemplary embodiments. However, these changes and modifications do not depart from the scope of the present disclosure.

FIG. 2 is a schematic diagram of at least a portion of an exemplary computing device that may implement a medical system 100 according to some embodiments of the present disclosure. As shown in FIG. 2, the computing device 200 may include a processor 210, a storage 220, an input/output (I/O) 230, and a communication port 240.

The processor 210 may execute a computer instruction (e.g., program code) in accordance with the techniques described in the present disclosure, and perform the functions of the processing device 140. The computer instruction may include a routine, a program, an object, a component, a data structure, a procedure, a module, and a function. The computer instruction may also include execution of specific functionalities described in the present disclosure. For example, the processor 210 may process data or information obtained from at least one of the medical device 110, the storage device 150, the one or more terminals 130, or any other components of the medical system 100. In some embodiments, the processor 210 may include one or more hardware processors, including a microcontroller, a microprocessor, a Reduced Instruction Set Computer (RISC), an Application-Specific Integrated Circuit (ASIC), an Application-Specific Instruction Set Processor (ASIP), a Central Processing Unit (CPU), a Graphics Processing Unit (GPU), a Physical Processing Unit (PPU), a microcontroller unit, a Digital Signal Processor (DSP), a Field-Programmable Gate Array (FPGA), an Advanced RISC Machine (ARM), a Programmable Logic Device (PLD), any circuit or processor capable of performing one or more functions, or any combination thereof.

For illustrative purposes only, only one processor is described in the computing device 200. However, it should be noted that the computing device 200, as disclosed in the present disclosure, may also include a plurality of processors. Therefore, at least one of the operations or method steps executed by the single processor, as disclosed in the present disclosure, may also be executed collectively or separately by the plurality of processors. For example, if in the present disclosure, the processor of the computing device 200 performs operations A and B, it should be understood that the operations A and B may also be performed by two or more different processors within the computing device 200. For example, the first processor may execute the operation A, and the second processor may execute the operation B, or first and second processors may jointly execute the operations A and B.

The storage 220 may store data or information obtained from at least one of the medical device 110, the storage device 150, the one or more terminals 130, or any other components of the medical system 100. In some embodiments, the storage 220 may include the high-capacity storage, the removable storage, the volatile read-write storage, the read-only storage, or any combination thereof. For example, the high-capacity storage may include a disk, an optical disk, a solid-state drive, etc. The removable storage may include a flash drive, a floppy disk, an optical disk, a storage card, a zip disk, a tape, etc. The volatile read-write storage may include Random Access Memory (RAM), which may include Dynamic RAM (DRAM), Double Data Rate Synchronous Dynamic RAM (DDR SDRAM), Static RAM (SRAM), T-RAM, Z-RAM, etc.

The read-only storage may include Mask ROM (MROM), Programmable ROM (PROM), Erasable Programmable ROM (EPROM), Electrically Erasable Programmable ROM (EEPROM), CD-ROM, Digital Versatile Disc-ROM (DVD-ROM), etc. In some embodiments, the storage 220 may store at least one of one or more programs or instructions to execute the exemplary methods described in the present disclosure.

The I/O 230 may at least input or output a signal, data, information, or the like. In some embodiments, the I/O 230 enables user interaction with the processing device 140. In some embodiments, the I/O 230 may include an input device and an output device. Exemplary input device may include a keyboard, a mouse, a touchscreen, a microphone, or a combination thereof. Exemplary output device may include a display device, a speaker, a printer, a projector, or a combination thereof. Exemplary display device may include a Liquid Crystal Display (LCD), a Light Emitting Diode (LED)-based display, a flat-panel display, a curved screen, a television device, a Cathode Ray Tube (CRT), a touchscreen screen, or a combination thereof.

The communication port 240 may connect to a network (e.g., the network 120) to facilitate data communication. The communication port 240 may establish a connection between at least one of the processing device 140, the medical device 110, the storage device 150, or the one or more terminals 130. The connection may be wired, wireless, or any other communication connection that facilitates at least one of data transmission or reception, or a combination thereof. The wired connection may include a cable, an optical cable, a telephone line, or any combination thereof. The wireless connection may include, for example, Bluetooth, Wi-Fi, WiMax, wireless LAN, ZigBee, a mobile network (e.g., 3G, 4G, 5G), or a combination thereof. In some embodiments, the communication port 240 may include at least one of a standardized communication port, e.g., RS232, RS485, etc. In some embodiments, the communication port 240 may be a specially designed communication port, for example, the communication port 240 may be designed in accordance with the Digital Imaging and Communications in Medicine (DICOM) protocol.

FIG. 3 is a schematic diagram of at least one of exemplary hardware or software components of a mobile device that may implement a terminal according to some embodiments of the present disclosure. As shown in FIG. 3, the mobile device 300 may include a communication platform 310, a display 320, a Graphics Processing Unit (GPU) 330, a Central Processing Unit (CPU) 340, an input/output (I/O) 350, a memory 360, and a storage 390. In some embodiments, any other suitable components, including but not limited to a system bus or a controller (not shown), may also be included in the mobile device 300. In some embodiments, a mobile operation system 370 (e.g., iOS™, Android™, and Windows Phone™) and one or more applications 380 may be loaded from the storage 390 into the memory 360 for execution by the CPU 340. The one or more applications 380 may include a browser or any other suitable mobile application for receiving and rendering information related to the medical system 100 or other information from the processing device 140. User interaction with information may be achieved through the I/O 350, and the information may be provided to other components of the processing device 140 or the medical system 100 through the network 120.

In order to implement the various modules, units, and their functionalities described in the present disclosure, a computer hardware platform may serve as the hardware platform for one or more components described in the present disclosure. A computer with a user interface element may be used as a personal computer (PC) or any other type of workstation or terminal device. If appropriately programmed, the computer may also serve as a server.

Figure 4:
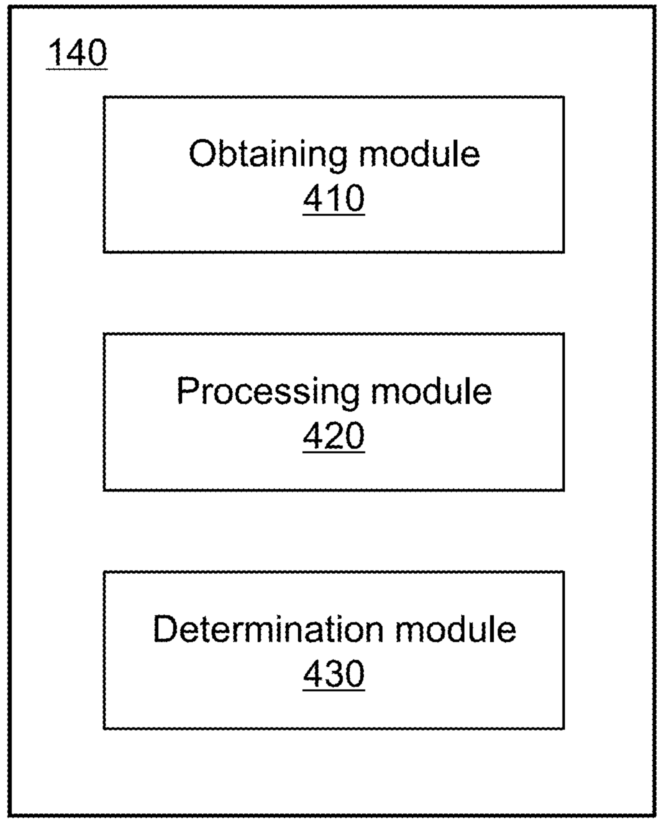
FIG. 4 is a block diagram of an exemplary processing device 140 according to some embodiments of the present disclosure.

FIG. 4 is a block diagram of an exemplary processing device 140 according to some embodiments of the present disclosure. The processing device 140 may include an obtaining module 410, a processing module 420, and a determination module 430.

The obtaining module 410 may obtain at least one of data or information related to the medical system 100. The at least one of data or information related to the medical system 100 may include scan data, relevant parameters of a kinetic model, information of a series of frames, values of one or more kinetic parameters, or any combination thereof. For example, the obtaining module 410 may obtain a plurality of sets of scan data of an object. As another example, the obtaining module 410 may obtain relevant parameters (e.g., an input function, a time-activity curve for a region of interest) of the kinetic model. Further descriptions regarding the obtaining of the scan data and the relevant parameters of the kinetic model may be found in other parts of the present disclosure, for example, in FIG. 5, FIG. 7, and corresponding descriptions (e.g., operations 530 and 720). In some embodiments, the obtaining module 410 may obtain the at least one of data or information related to the medical system 100 from one or more other components (e.g., the medical device 110, the storage device) of the medical system 100.

The processing module 420 may process the at least one of data or information related to the medical system 100. For example, the processing module 420 may obtain the information of the series of frames by framing the plurality of sets of scan data. More descriptions about the framing may be found elsewhere (e.g., operation 520 and related description) in the present disclosure. As another example, the processing module 420 may use a bounded function to replace at least one of one or more kinetic parameters in the kinetic model based on physiological significance of the one or more kinetic parameters. More descriptions on using the bounded function to replace at least one of the one or more kinetic parameters in the kinetic model may be found elsewhere (e.g., operation 730 and related description) of the present disclosure.

The determination module 430 may determine the at least one of data or information related to the medical system 100. In some embodiments, the determination module 430 may obtain metabolic information of a tracer inside the object based on the information of the series of frames. For example, the determination module 430 may directly reconstruct a parameter image based on the information of the series of frames and the kinetic model. As another example, the determination module 430 may indirectly reconstruct the parameter image based on the information of the series of frames and the kinetic model. More descriptions regarding the reconstruction of the parameter image may be found elsewhere (e.g., operation 530 and related description) of the present disclosure. In some embodiments, the determination module 430 may determine values of the one or more kinetic parameters by solving for values of the bounded function in the kinetic model based on the scan data. More descriptions on determining the values of the one or more kinetic parameters by solving for the values of the bounded function in the kinetic model may be found in other parts (e.g., operation 740 and related description) of the present disclosure.

It should be noted that the above description of the processing device 140 is provided for illustrative purposes only and is not intended to limit the scope of the present disclosure. Those skilled in the art may make various changes and modifications based on the description in the present disclosure. However, these changes and modifications are within the scope of the present disclosure. For example, the processing device 140 may also include a storage module for data storage (not shown in the figure). As another example, the processing module 420 and determination module 430 may be integrated into a single module.

Figure 5:
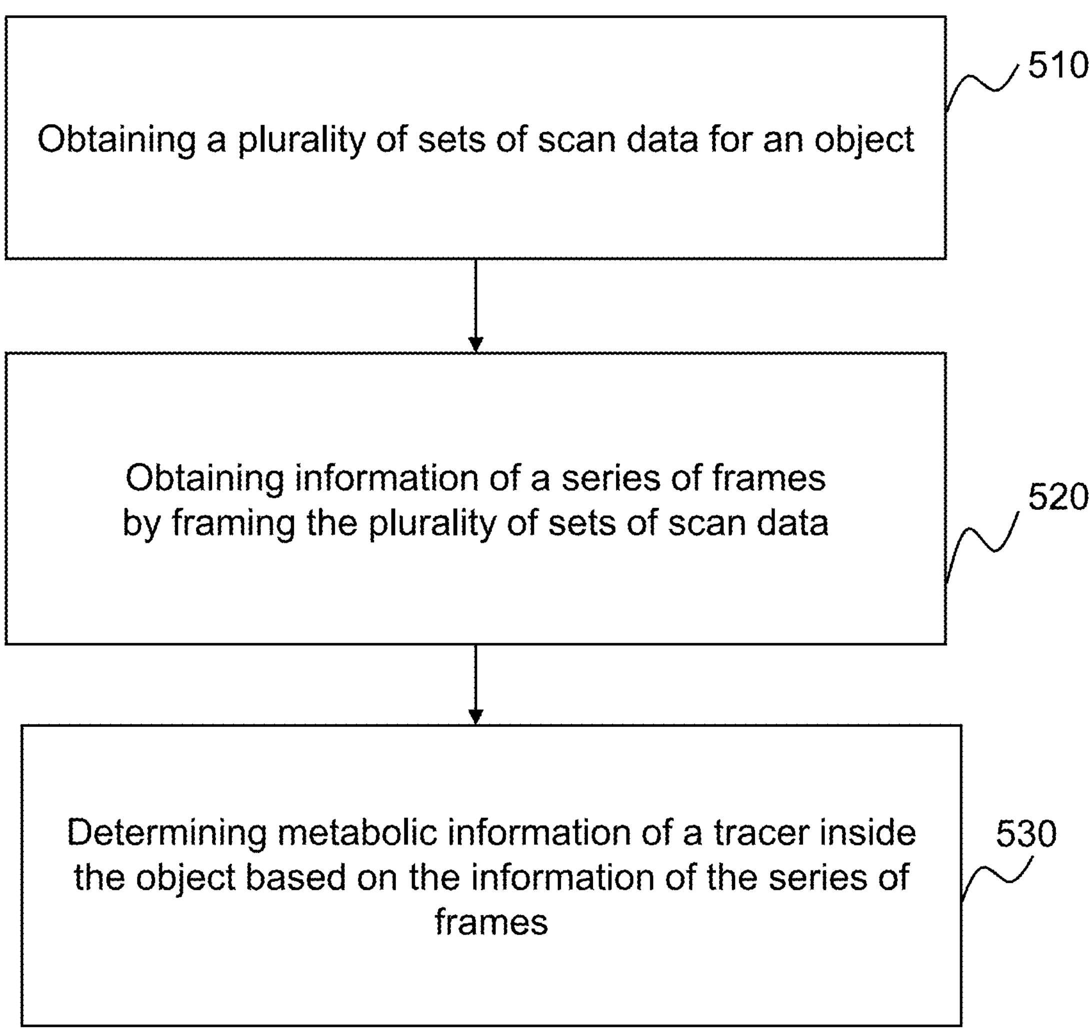
FIG. 5 is a flowchart of an exemplary process for determining metabolism information of a tracer inside an object according to some embodiments of the present disclosure.

FIG. 5 is a flowchart of an exemplary process for determining metabolism information of a tracer inside an object according to some embodiments of the present disclosure. In some embodiments, at least a portion of a process 500 may be executed by the processing device 140 (for example, implemented by the computing device 200 as shown in FIG. 2). For example, the process 500 may be stored in a form of an instruction (e.g., an application) in a storage device (e.g., the storage device 150, the storage 220, the storage 390) and called and/or executed by the processing device 140 (e.g., the processor 210 as shown in FIG. 2, the CPU 340 as shown in FIG. 3, or one or more modules in the processing device 140 as shown in FIG. 4). Operations of the process shown below are for illustrative purposes only. In some embodiments, the process 500 may utilize one or more additional operations not described and/or exclude one or more operations discussed here. Furthermore, the sequence of the operations of the process 500 depicted in FIG. 5 and described below is not intended to be restrictive.

In 510, the processing device 140 (e.g., the obtaining module 410) may obtain a plurality of sets of scan data of an object.

In some embodiments, scan data may include PET scan data, SPECT scan data, MRI data, CT data, and so on. The scan data may be data obtained by the medical device 110 through scanning the object. In some embodiments, the scan data may be PET projection data obtained by scanning the object using a PET device. In some embodiments, the PET projection data may include list mode data or sinogram data. In some embodiments, dynamic PET imaging may be performed on the object (e.g., a patient) to obtain a plurality of sets of PET scan data. For example, the PET device may perform multi-bed scanning on the object through a step-wise acquisition mode to obtain the plurality of sets of PET scan data. Each set of scan data is obtained by performing a single-bed scanning on at least a portion of the object. In the step-wise acquisition mode, a scanning bed may move in a step-wise manner along a central axis (e.g., the Y-axis in FIG. 1) of the scanning region 113 to achieve the multi-bed scanning on the object by the PET device.

In some embodiments, scanning ranges corresponding to two sets of scan data obtained from scanning two adjacent beds may have an overlapping region. For example, the two adjacent beds may have an overlapping region. Correspondingly, scanning ranges of two scan images corresponding to the two sets of scan data obtained from scanning the two adjacent beds have the overlapping region.

Figure 6A:
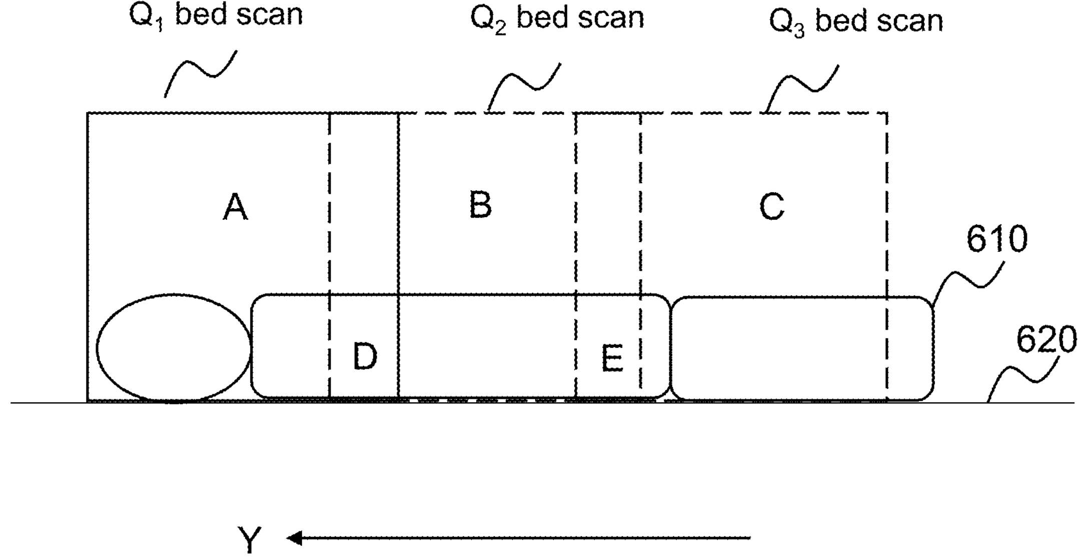
FIG. 6A is a schematic diagram of exemplary multi-bed scanning according to some embodiments of the present disclosure.

FIG. 6A is a schematic diagram of exemplary multi-bed scanning according to some embodiments of the present disclosure. As shown in FIG. 6A, a PET device may perform multi-bed scanning on a patient 610 located on a scanning bed 620. For example, during the scanning process, the scanning bed 620 may move along the Y-axis to achieve three bed scans. In a $Q_1$ bed scan, the PET device may scan region A of the patient 610, obtaining a first set of scan data corresponding to a $Q_1$ scan image.

In a $Q_2$ bed scan, the PET device may scan region B of the patient 610, obtaining a second set of scan data corresponding to a $Q_2$ scan image. In a $Q_3$ bed scan, the PET device may scan region C of the patient 610, obtaining a third set of scan data corresponding to a $Q_3$ scan image. Areas of the regions A, B, and C may be the same or different. The regions A, B, and C may partially overlap with each other. For example, the regions A and B have an overlapping region D, the regions B and C have an overlapping region E. Areas of the overlapping regions D and E may be the same or different. Correspondingly, scanning ranges of the $Q_1$ scan image and the $Q_2$ scan image have the overlapping region D, and scanning ranges of the $Q_2$ scan image and the $Q_3$ scan image have the overlapping region E. That is, the $Q_1$ bed and the $Q_2$ have the overlapping region E. It should be noted that the illustration is for explanatory purposes only, and in some embodiments, the PET device may perform any count of bed scans on the patient 610.

In some embodiments, durations of the bed scans may be the same or different. For example, the durations of the $Q_1$ bed scan, the $Q_2$ bed scan, and the $Q_3$ bed scan may all be 20 seconds. As another example, the $Q_1$ bed scan may last 10 seconds, the $Q_2$ bed scan may last 20 seconds, and the $Q_3$ bed scan may last 40 seconds. In some embodiments, there may be a time interval or no time interval between two adjacent bed scans. For example, the PET device may immediately start the $Q_2$ bed scan after completing the $Q_1$ bed scan. As another example, the PET device may wait for a certain time interval after completing the $Q_1$ bed scan before starting the $Q_2$ bed scan.

In some embodiments, the processing device 140 may generate a scan image based on scan data obtained during each bed scan. For example, the processing device 140 may reconstruct a PET image based on PET scan data obtained during one bed scan. For example, if the PET device performs five bed scans on the object, the processing device 140 may obtain five sets of PET scan data and reconstruct five PET images, each corresponding to one bed scan. In some embodiments, the processing device 140 may generate a PET image based on the PET scan data using an image reconstruction algorithm. The PET image may display the uptake of a tracer inside the object. Exemplary image reconstruction algorithm may include an iterative algorithm, an analytical algorithms, etc. The iterative algorithm may include a Maximum Likelihood Estimation (MLE) algorithm, an Ordered Subset Expectation Maximization (OSEM), etc. The analytical algorithm may include a Filtered Back Projection (FBP) algorithms, etc.

In some embodiments, the processing device 140 may obtain a plurality of sets of scan data from one or more components (e.g., at least one of the medical device 110, the one or more terminals 130, or the storage device 150) of the medical system 100 or an external storage through the network 120. For example, the medical device 110 may transmit the obtained plurality of sets of scan data (e.g., projection data) to a storage device (e.g., the storage device 150 or an external storage device) for storage. The processing device 140 may then obtain the plurality of sets of scan data from the storage device. As another example, the processing device 140 may directly obtain the plurality of sets of scan data from the medical device 110.

In 520, the processing device 140 (e.g., the processing module 420) may obtain information of a series of frames by framing the plurality of sets of scan data. The information of the series of frames may also be referred to as frame information. The overlapping region between two scan images corresponding to the two sets of scan data obtained from the two adjacent bed scans corresponds to two frames in the two scan images. Specifically, the overlapping region between the two scan images corresponding to the two sets of scan data obtained from the two adjacent bed scans corresponds to two sub-images in the two scan images and the two sub-images are designated as the two frames. In some embodiments, a frame corresponding to the overlapping region in a scan image may include the overlapping region. For example, a scanning range of the frame corresponding to the scan image may be greater than or equal to a scanning range of the overlapping region.

In some embodiments, for each of the plurality of sets of scan data, the processing device 140 may extract a first part of scan data corresponding to the overlapping region and a second part of scan data corresponding to a non-overlapping region. The overlapping region may be a region where a scanning range of a scan image corresponding to the each of the plurality of sets of scan data overlaps with a scanning range of a scan image corresponding to scan data of an adjacent bed. The adjacent bed refers to a bed adjacent to the bed corresponding to the each of the plurality of sets of scan data.

The processing device 140 may determine time information corresponding to the first part of scan data and time information corresponding to the second part of scan data. In some embodiments, the processing device 140 may determine the time information corresponding to the each of the plurality of sets of scan data based on a start scan time and an end scan time of the each of the plurality of sets of scan data. For example, the processing device 140 may use a midpoint between the start scan time and end scan time of the each of the plurality of sets of scan data as the time information corresponding to the each of the plurality of sets of scan data. The processing device 140 may designate the time information corresponding to the each of the plurality of sets of scan data as the time information for both the first part of scan data and the second part of scan data. The processing device 140 may designate the first part of scan data and corresponding time information as information of a frame of the two frames, and the second part of scan data and corresponding time information as information of another frame of the two frames.

In some embodiments, the two adjacent beds may include a first bed and a second bed, where a first set of scan data is obtained from the first bed, and a second set of scan data is obtained from the second bed. Based on the first set of scan data, the processing device 140 may determine a first scan image. Based on the second set of scan data, the processing device 140 may determine a second scan image. Scanning ranges of the first scan image and the second scan image have an overlapping region. A sub-image corresponding to the overlapping region in the first scan image and a sub-image corresponding to the overlapping region in the second scan image are designated as the two frames. The processing device 140 may determine time information corresponding to a first frame (i.e., the first sub-image corresponding to the overlapping region in the first scan image) of the two frames, which corresponds to the overlapping region in the first scan image, based on a start scan time and an end scan time of the first set of scan data (or the first scan image). For example, the processing device 140 may use a midpoint between the start scan time and end scan time of the first set of scan data (or the first scan image) as the time information corresponding to the first frame in the first bed scan. The processing device 140 may determine time information corresponding to a second frame (i.e., the second sub-image corresponding to the overlapping region in the second scan image) of the two frames, which corresponds to the overlapping region in the second scan image, based on a start scan time and an end scan time of the second set of scan data (or the second scan image). For example, the processing device 140 may use a midpoint between the start scan time and end scan time of the second set of scan data (or the second scan image) as the time information corresponding to the second frame in the second bed scan.

For example, as shown in FIG. 6A, the two adjacent beds may include the $Q_1$ bed and the $Q_2$ bed. The processing device 140 obtains a $Q_1$ set of scan data at the $Q_1$ bed, and the $Q_1$ set of scan data corresponds to a $Q_1$ scan image. The processing device 140 obtains a $Q_2$ set of scan data at the $Q_2$ bed, and the $Q_2$ set of scan data corresponds to a $Q_2$ scan image. Scanning regions of the $Q_1$ scan image and the $Q_2$ scan image have an overlapping region D. A sub-image corresponding to the overlapping region D in the $Q_1$ scan image and a sub-image corresponding to the overlapping region D in the $Q_2$ scan image may be designated as two frames. In some embodiments, the sub-images corresponding to the overlapping region D in at least one of the $Q_1$ scan image or the $Q_2$ scan image may include the overlapping region. For example, areas of the sub-images corresponding to overlapping region D in at least one of the $Q_1$ scan image or the $Q_2$ scan image may be equal to or greater than an area of the overlapping region. The processing device 140 may determine time information corresponding to a first frame in the $Q_1$ bed scan, which corresponds to the overlapping region D in the $Q_1$ scan image, based on a start scan time and an end scan time of the $Q_1$ scan image. For example, the processing device 140 may use a midpoint between the start scan time and end scan time of the $Q_1$ scan image as the time information corresponding to the first frame in the $Q_1$ bed scan. The processing device 140 may determine time information corresponding to a second frame in the $Q_2$ bed scan, which corresponds to the overlapping region D in the $Q_2$ scan image, based on a start scan time and an end scan time of the $Q_2$ scan image. For example, the processing device 140 may use a midpoint between the start scan time and end scan time of the $Q_2$ scan image as the time information corresponding to the second frame in the $Q_2$ bed scan.

Figure 6B:
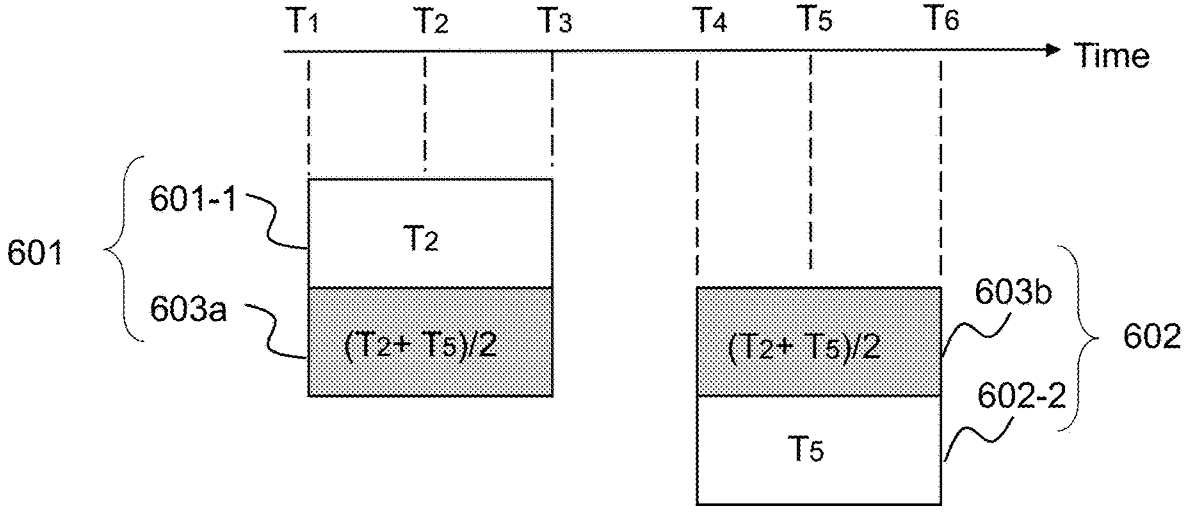
FIG. 6B is a schematic diagram of a traditional framing approach.

FIG. 6B is a schematic diagram of a traditional framing approach. As shown in FIG. 6B, a first scan image 601 and a second scan image 602 are two adjacent bed scan images. A start scan time of the first scan image 601 is $T_1$, an end scan time of the first scan image 601 is $T_3$, and a midpoint between $T_1$ and $T_3$ is $T_2$. A start scan time of the second scan image 602 is $T_4$, an end scan time of the second scan image 602 is $T_6$, and a midpoint between $T_4$ and $T_6$ is $T_5$. The first scan image 601 and the second scan image 602 have an overlapping region. The overlapping region corresponds to a sub-image 603*a* in the first scan image 601 and a sub-image 603*b* in the second scan image 602. In traditional framing, the sub-image 603*a* and the sub-image 603*b* may be treated as one frame. For example, the processing device 140 may generate a merged image by weighted calculation of the sub-image 603*a* and the sub-image 603*b*, and use the merged image as the frame corresponding to the overlapping region, with time information of the overlapping region being $(T_2+T_5)/2$. A sub-image 601-1 in a non-overlapping region of the first scan image 601 corresponds to a frame with time information $T_2$. A sub-image 602-2 in the non-overlapping region of the second scan image 601 corresponds to a frame with time information $T_5$.

Figure 6C:
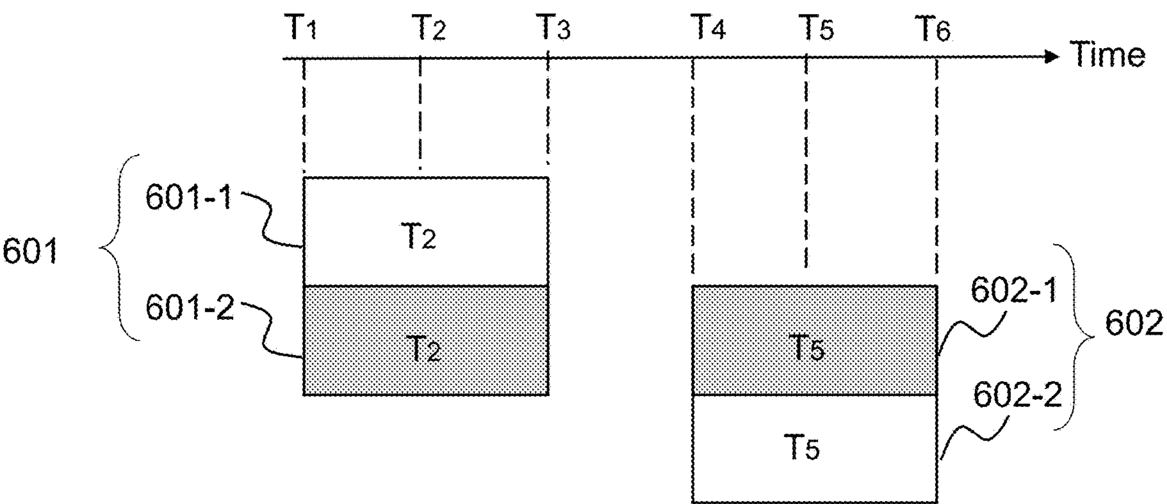
FIG. 6C is a schematic diagram of a framing approach according to some embodiments of the present disclosure.

FIG. 6C is a schematic diagram of a framing approach according to some embodiments of the present disclosure. According to the framing approach proposed in the present disclosure, the sub-image 601-2 and the sub-image 602-1 may be treated as two frames. The time information of the first frame corresponding to sub-image 601-2 is the midpoint of the start scan time and the end scan time of the first scan image 601. For example, the time information of the first frame corresponding to sub-image 601-2 is $T_2$. The time information of the second frame corresponding to sub-image 602-1 is the midpoint of the start scan time and the end scan time of the second scan image 602. For example, the time information of the second frame corresponding to sub-image 602-1 is $T_5$. The time information of the frame corresponding to the sub-image 601-1 of the non-overlapping in the first scan image 601 is $T_2$. The time information of the frame corresponding to the sub-image 602-2 of the non-overlapping in the second scan image 601 is $T_5$. In some embodiments, the processing device divides the overlapping region between the two adjacent bed scans into two frames. This approach takes into account the tracer activity changes in the two frames during adjacent bed scans, providing a more accurate representation of physiological changes. This is especially beneficial when dealing with longer frame durations or rapidly changing tracer activities, resulting in a higher quality parameter image.

In some embodiments, the information of the series of frames also includes weights of the two frames corresponding to the overlapping region in the two adjacent bed scans. In some embodiments, the processing device 140 may determine the weight of a first frame corresponding to the overlapping region in the first scan image based on position information of the overlapping region in the first scan image. The first scan image is determined based on the first set of scan data. The processing device 140 may determine the weight of a second frame corresponding to the overlapping region in the second scan image based on position information of the overlapping region in the second scan image. The second scan image is determined based on the second set of scan data. In some embodiments, the processing device 140 may determine the weight of the frame corresponding to the overlapping region based on position information of each pixel (or each voxel) of the overlapping region in the corresponding scan image. For example, the further a pixel is from a central position of the scanning device along a direction of movement of the scanning bed (e.g., the Y-axis direction as shown in FIG. 6A), the smaller the weight corresponding to the pixel.

In some embodiments, the weights may be represented as a weight matrix. Each weight value in the weight matrix corresponds to a pixel in a corresponding frame of the overlapping region. For example, if a frame corresponding to the overlapping region is a 256-pixel×256-pixel image, the weight matrix may be a 256×256 numeric matrix, with each weight value in the weight matrix corresponding to a position of a pixel in the frame corresponding to the overlapping region. In some embodiments, the weight value in the weight matrix is related to a distance between a physical point of the object corresponding to the pixel in the frame and the central position of the scanning device along the direction (e.g., the Y-axis direction as shown in FIG. 6A) of movement of the scanning bed. For example, the further the physical point of the object corresponding to the pixel in the frame is from the central position of the scanning device, the smaller the weight value corresponding to the pixel. In some embodiments, the distance between the physical point of the object corresponding to the pixel and the central position of the scanning device may be related to a position of the pixel in the scan image of the corresponding frame. For example, the further the pixel is from a central pixel of the scan image to which the pixel belongs, the further the corresponding physical point of the object is from the central position of the scanning device. In some embodiments, the weight value in the weight matrix is also related to a scan time of the scan image corresponding to the overlapping region. For example, a longer scan time corresponds to a larger weight value. In some embodiments, the weight value in the weight matrix is determined based on a combination of the distance between the physical point of the object corresponding to the pixel in the frame and the central position of the scanning device and the scan time of the scan image corresponding to the overlapping region.

In 530, the processing device 140 (e.g., the determination module 430) may determine metabolic information of a tracer inside the object based on the information of the series of frames.

In some embodiments, the processing device 140 may determine the values of the one or more kinetic parameters based on the information of the series of frames. The one or more kinetic parameters may indicate the metabolic information of the tracer inside the object. In some embodiments, the one or more kinetic parameters may be physiological parameters related to kinetics of the tracer inside the object after injection. For example, the one or more kinetic parameters may include a transfer rate of the tracer from plasma to tissue (referred to as a $K_1$ parameter of the tracer), a transfer rate of the tracer from tissue to plasma (referred to as a $k_2$ parameter of the tracer), a phosphorylation rate of a FDG tracer (referred to as a $k_3$ parameter of the tracer), a dephosphorylation rate of the FDG tracer (referred to as a $k_4$ parameter of the tracer), a plasma concentration in tissue ($V_b$), a net metabolic rate (Ki), a perfusion rate of the tracer, or any combination thereof.

The kinetic model may describe exchange of the tracer between different compartments inside the object during a scan period through the one or more kinetic parameters. In some embodiments, the kinetic model may include a compartment model (e.g., a one-compartment model, a two-compartment model), a retention model, or any combination thereof. The one-compartment model describes a transmission process of the tracer between blood/plasma and tissue. In some embodiments, a user (e.g., a doctor) may select an appropriate kinetic model for parameter imaging based on factors such as a type of the tracer, patient information (e.g., a region of interest in a patient, a body type of the patient), information of the medical device (e.g., the PET device), scan parameters (e.g., a count of bed scans, a scan time), and types of the one or more kinetic parameters desired.

In some embodiments, the processing device 140 may obtain relevant parameters of the kinetic model, for example, at least one of an input function (IF) or a time-activity curve (TAC) for the region of interest. The input function may reflect changes in concentration of the tracer in the plasma over time. For example, the input function may be represented as a TAC that indicates changes in the concentration of the tracer in the plasma over time. The TAC of the region of interest may reflect changes in the concentration of the tracer over time in the region of interest.

In some embodiments, the processing device 140 may obtain the input function through an invasive approach. In some embodiments, the processing device 140 may obtain the input function through blood sampling. For example, the blood sampling may include sampling a certain amount of arterial blood from the object (e.g., the patient) injected with the tracer at a plurality of time points to determine the TAC of the tracer in the plasma.

In some embodiments, the processing device 140 may obtain the input function through a non-invasive approach. In some embodiments, the processing device 140 may obtain the input function or the TAC for the region of interest through image analysis. The image analysis methods may include reconstructing a plurality of scan images (e.g., PET images) obtained at different time points after injecting the tracer into the object and fitting the input function or the TAC for the region of interest based on the plurality of scan images. For example, if the scanning device performs 30 scans on the object, generating 30 scan images, the processing device 140 may determine activity values (or concentration values) of the tracer in the blood at 30 different time points based on the 30 scan images. The time points of the scan images refer to midpoints of scanning time intervals corresponding to the scan images (e.g., the midpoints between the start and end times of the scan images). The processing device 140 may determine the time-activity curve TAC of the tracer in the plasma based on the 30 time points and the activity values (or the concentration values) corresponding to the 30 time points.

In some embodiments, the processing device 140 may determine the input function or the TAC for the region of interest based on the series of frames. As an example, the following explanation illustrates how the processing device 140 may obtain the TAC for the region of interest based on the series of frames through the image analysis approach. For each frame of the series of frames, the processing device 140 may determine a region of interest in an image corresponding to each frame. For the image corresponding to the each frame, the processing device 140 may determine a pixel value (or a voxel value) related to the region of interest. Based on the pixel value (or the voxel value) related to the region of interest, the processing device 140 may determine an activity value (or a concentration value) of the tracer in the region of interest within a scanning time interval corresponding to the each frame. The processing device 140 may determine the TAC for the region of interest based on a plurality of activity values (or a plurality of concentration values) related to the region of interest within a plurality of scanning time intervals corresponding to a plurality of frames.

It should be noted that the approach described for obtaining the input function or the TAC for the region of interest are provided for illustrative purposes only and are not intended to limit the scope of the present disclosure. Those skilled in the art may use other approaches to obtain the input function or the TAC for the region of interest.

In some embodiments, the processing device 140 may directly or indirectly reconstruct a parameter image based on the plurality of sets of scan data, the information of the series of frames, and the kinetic model. The parameter image may include a $K_1$ parameter image, a $k_2$ parameter image, a $k_3$ parameter image, a Ki parameter image, or any combination thereof. Each pixel (or voxel) in the parameter image corresponds to a physical point of the object, and each pixel value (or each voxel value) in the parameter image represents a value of a kinetic parameter of a corresponding physical point of the object.

In some embodiments, the processing device 140 may directly reconstruct the parameter image based on the information of the series of frames (e.g., the image corresponding to the each frame and scan time information) and the kinetic model. For example, the processing device 140 may directly reconstruct the parameter image based on the information of the series of frames and the kinetic model using a Patlak reconstruction algorithm using Formula (1) and Formula (2):

$$\hat{x}_{jm}^{n+1} = \frac{x_{jm}(\hat{\theta}_j^n)}{\sum_i p_{ij}} \sum_i p_{ij} \frac{y_{im}}{\overline{y}_{im}^n}, \tag{1}$$

$$\hat{\theta}_{jk}^{n+1} = \frac{\hat{\theta}_{jk}^n}{\sum_m b_{mk}} \sum_m b_{mk} \frac{\hat{x}_{jm}^{n+1}}{x_{jm}(\hat{\theta}_j^n)}, \tag{2}$$

wherein, θ represents the one or more kinetic parameters; x represents a dynamic scan image (i.e., the series of frames); y represents a dynamic projection; b represents a kinetic matrix; p represents a system matrix; n, i, j, m, and k represent iteration count, projection, image voxel, frame, and kinetic parameter indices, respectively. The Formula (1) and the Formula (2) may represent a process of reconstructing the parameter image based on the information of the series of frames and the kinetic model using the Patlak reconstruction algorithm. That is, the Formula (1) and the Formula (2) describe a relationship between the information of the series of frames, the kinetic model, and the parameter image.

In some embodiments, the processing device 140 may directly reconstruct the parameter image based on the information of the series of frames (including weights of the frame) and the kinetic model using a weighted algorithm (e.g., a weighted iterative algorithm). Exemplary iterative algorithm may include a Maximum Likelihood Estimation (MLE) algorithm, a Least Squares algorithm, an Ordered Subset Expectation Maximization (OSEM) algorithm, a Maximum A Posteriori Probability (MAP) algorithm, a Weighted Least Squares (WLS) algorithm, or any combination thereof. For example, the processing device 140 may directly reconstruct the parameter image based on the information of the series of frames (including the weights of the series of frames) and the kinetic model using a weighted Expectation Maximization (EM) algorithm according to Formula (3):

$$\hat{\theta}_{jk}^{n+1} = \frac{\hat{\theta}_{jk}^n}{\sum_m w_{jm} b_{mk}} \sum_m w_{jm} b_{mk} \frac{w_{jm}\hat{x}_{jm}^{n+1}}{w_{jm} x_{jm}(\hat{\theta}_j^n)}, \tag{3}$$

wherein, w represents the weight value. In some embodiments, the Formula (3) may be written in a matrix form to obtain Formula (4):

$$WX = (WB)\theta, \tag{4}$$

wherein, θ represents the one or more kinetic parameter, X represents the dynamic scan image (i.e., the series of frames), B represents the dynamic matrix, and W represents the weight matrix.

During the PET scanning process, the overlapping region between the two scan images obtained from the two adjacent beds are typically located at edges of the beds, with fewer PET counts, lower sensitivity, and positions of the overlapping region relative to the two adjacent bed positions are different for the two adjacent bed scans. When treating the overlapping region between the two scan images of the two adjacent bed scans as two frames, different noise levels of the overlap region in the two bed positions may result in additional image artifacts. Therefore, it is necessary to account for variations in noise due to differences in count sensitivity between different frames and use different weights for the two frames corresponding to the overlapping region. By assigning different weights to the two frames in the overlapping region between the two adjacent bed positions and using the weights in pharmacokinetic calculation, image noise can be reduced, and the artifact at the edge of the overlapping region can be eliminated. For example, as described in the Formulas (3) and (4), during the iterative reconstruction process for parameter imaging, multiplying the dynamic matrix and the information of the series of frames by the weights results in a parameter image with reduced noise.

In some embodiments, the processing device 140 may indirectly reconstruct the parameter image based on the information of the series of frames (e.g., the image corresponding to the each frame and the scan time information, etc.) and the kinetic model. For example, the processing device 140 may reconstruct a plurality of scan images corresponding to the series of frames based on the information of the series of frames. The processing device 140 may then determine the values of the one or more kinetic parameters based on the plurality of scan images and reconstruct the parameter image. Specifically, the processing device 140 may determine each point in each scan image, wherein the each point corresponds to a physical point of the object. The processing device 140 may determine a Time-Activity Curve (TAC) of the each point based on the pixel value (or the voxel value) of the each point in the each scan image and corresponding time information of the each scan image. Then, the processing device 140 may determine one or more kinetic parameters of the each point based on the TAC of the each point and the kinetic model. Finally, the processing device 140 may reconstruct the parameter image based on the one or more kinetic parameters of the each point.

In some embodiments, the processing device 140 may use a bounded function to replace at least one of the one or more kinetic parameters in the kinetic model based on physiological significance of the at least one of the one or more kinetic parameters. The processing device 140 may determine the values of the one or more kinetic parameters by solving for values of the bounded function in the kinetic model. Further descriptions regarding using the bounded function to replace the at least one of the one or more kinetic parameters may be found elsewhere (e.g., in FIG. 7 and related descriptions) in the present disclosure.

It should be noted that the descriptions above in the present disclosure are provided for illustrative purposes only, and are not intended to limit the scope of the present disclosure. Those skilled in the art may make various changes and modifications based on the descriptions in the present disclosure. However, these changes and modifications remain within the scope of the present disclosure. For example, while the flowchart 500 is described with the PET image obtained from the PET device as an example, the method for parameter imaging provided in the present disclosure may also be applied to a process of parameter imaging based on another type of scan data (e.g., SPECT scan data, MRI data, CT data, etc.) obtained from another device (e.g., a SPECT device, a MRI device, a CT devices, etc.).

In some embodiments, the one or more kinetic parameters (or the parameter images) may be used to assess a physiological function of at least one of an organ or a tissue of the object. For example, the processing device 140 may determine whether a lesion is present in the body of the object based on the one or more kinetic parameters related to the object. Specifically, the processing device 140 may assess whether the lesion is present in the body of the object by comparing a value of the kinetic parameter related to the object to a standard value of the kinetic parameter. If a difference between the value of the kinetic parameter related to the object and the standard value of the kinetic parameter exceeds a preset range, it may be determined that the lesion may be present at a corresponding location in the body of the object. In some embodiments, at least one of a clinical experiment or empirical data may be used to determine the standard value of the kinetic parameter.

Figure 6D:
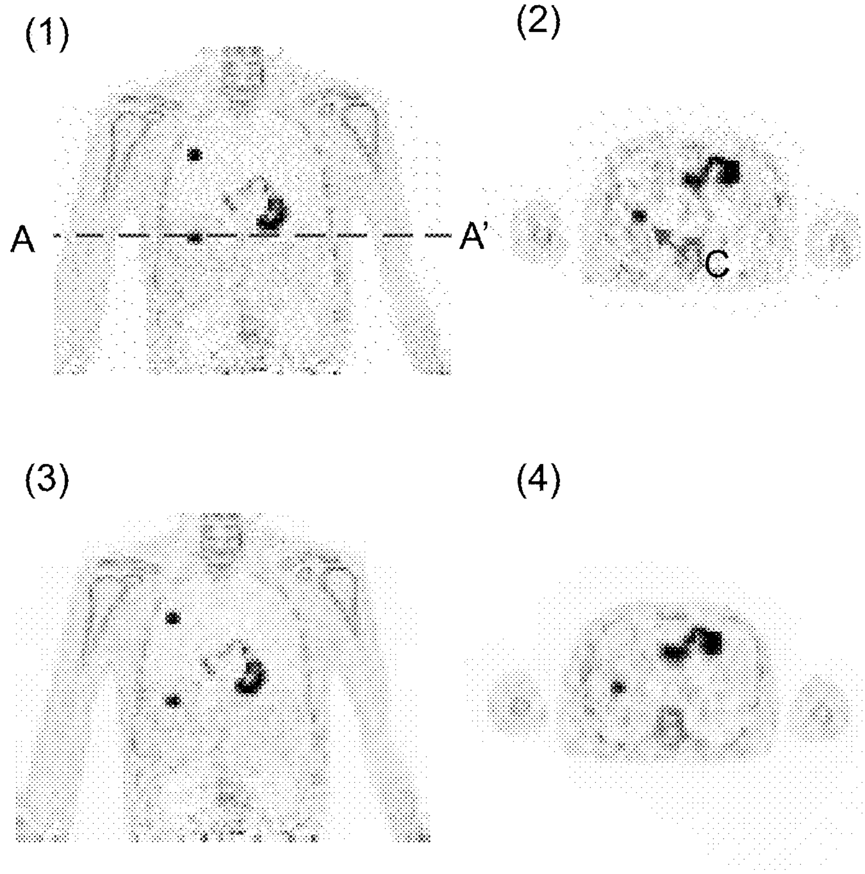
FIG. 6D is a schematic diagram of Ki parameter images reconstructed using a traditional Expectation Maximization (EM) algorithm and a weighted EM algorithm.

FIG. 6D is a schematic diagram of Ki parameter images reconstructed using a traditional Expectation Maximization (EM) algorithm and a weighted EM algorithm.

As shown in FIG. 6D, images (1) and (2) are Ki parameter images of a simulated model body reconstructed using the traditional EM algorithm, wherein the image (1) is a Ki parameter image of a coronal plane corresponding to the simulated model body, and the image (2) is a Ki parameter image of a cross-section of the plane A-A' in the image (1). Images (3) and (4) are Ki parameter images of the simulated model body reconstructed using the weighted EM algorithm provided in the present disclosure, wherein the image (3) is a Ki parameter image of the coronal plane corresponding to the simulated model body, and the image (4) is a Ki parameter image of the cross-section of the simulated model body. It may be seen from the images that the Ki parameter images reconstructed using the weighted EM algorithm have less noise compared to the Ki parameter images reconstructed using the traditional EM algorithms. The arrow (C) in the image (2) indicates some noise in the Ki parameter image.

Figure 6E:
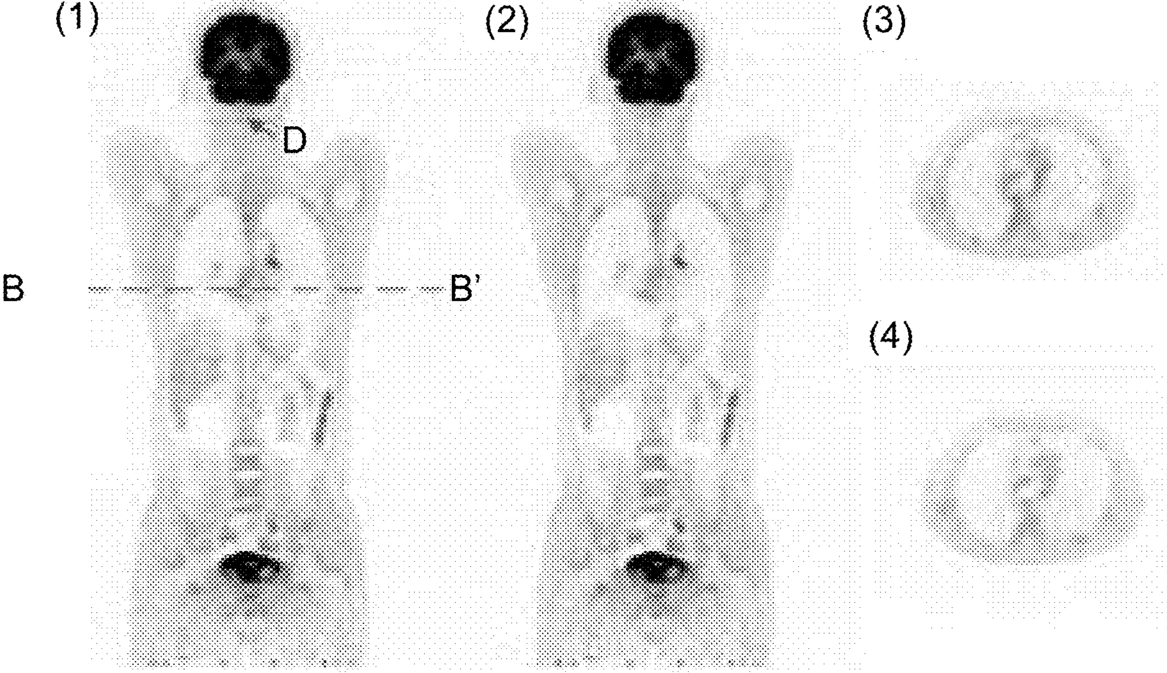
FIG. 6E is a schematic diagram of Ki parameter images reconstructed using the traditional Expectation Maximization (EM) algorithm and the weighted EM algorithm.

FIG. 6E is a schematic diagram of Ki parameter images reconstructed using the traditional Expectation Maximization (EM) algorithm and the weighted EM algorithm.

As shown in FIG. 6E, images (1) and (3) are Ki parameter images of a patient reconstructed using the traditional EM algorithms, where the image (1) is a Ki parameter image of a coronal plane corresponding to the patient, and the image (3) is a Ki parameter image of a cross-section corresponding to the plane B-B' in image (1). Images (2) and (4) are Ki parameter images of the patient reconstructed using the weighted EM algorithm, wherein the image (2) is a Ki parameter image of the coronal plane corresponding to the patient, and the image (4) is a Ki parameter image of the cross-section corresponding to the patient. It may be seen that the Ki parameter images reconstructed using the weighted EM algorithm have fewer artifacts compared to the Ki parameter images reconstructed using the traditional EM algorithm. The arrow (D) in the image (1) points to some artifacts in the Ki parameter image.

Figure 6F:
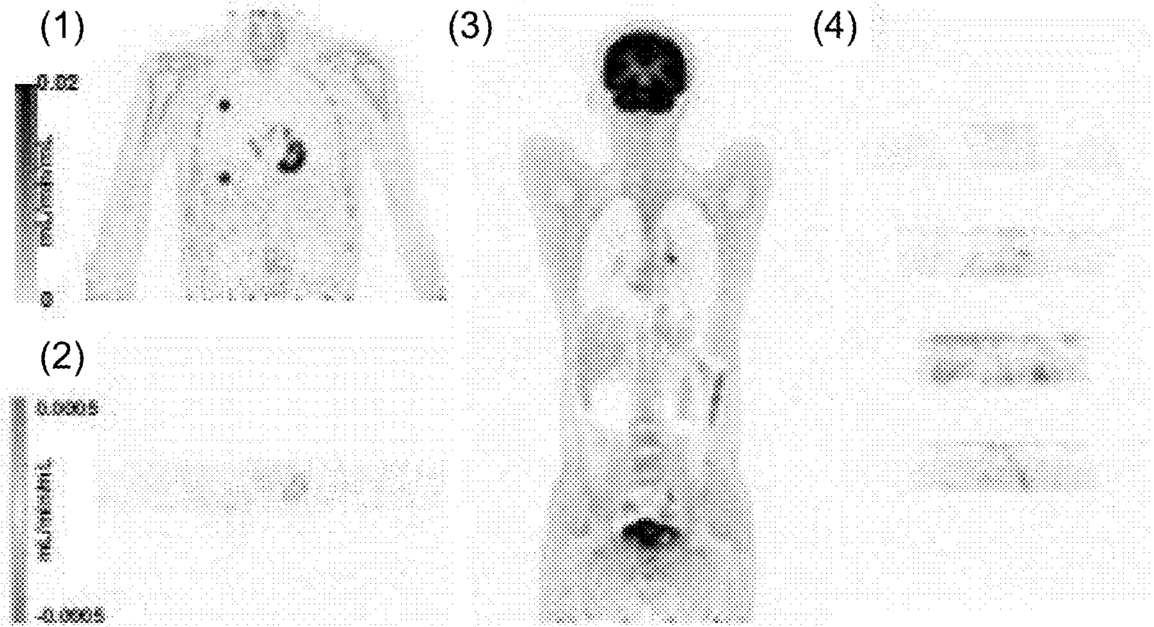
FIG. 6F is a schematic diagram of difference images of Ki parameter images obtained using different framing approaches according to some embodiments of the present disclosure.

FIG. 6F is a schematic diagram of difference images of Ki parameter images obtained using different framing approaches according to some embodiments of the present disclosure.

As shown in FIG. 6F, the image (1) represents a Ki parameter image of the simulated model body obtained using a traditional framing approach (i.e., the overlapping region between the two adjacent bed positions is considered as a single frame). The image (3) is a Ki parameter image of the patient obtained using the traditional framing approach. Images (2) and (4) represent the difference images between Ki parameter images (i.e., the images (1) and (3)) obtained using the traditional framing approach and Ki parameter images obtained using the framing approach provided in the present disclosure (i.e., the overlap region between the two adjacent bed positions is considered as two frames).

It may be seen from the images (2) and (4) that there are differences between the Ki parameter images obtained from the two framing approaches in the overlapping region. Moreover, the difference images between the Ki parameter images of the patient obtained using the two framing approaches are more pronounced compared to the difference images obtained from the simulated model body using the two framing approaches, for example, in the abdominal region. This is mainly because in performing the pharmacokinetic analysis using the traditional framing approach, an assumption on the concentration changes of the tracer in the two adjacent bed position scans is different from an actual situation significantly. The framing approach provided in the present disclosure, which accounts for changes in the tracer activity between the two frames in the two adjacent bed scans, more accurately reflects actual physiological changes, thereby improving the accuracy of the parameter image of the overlapping region.

Figure 7:
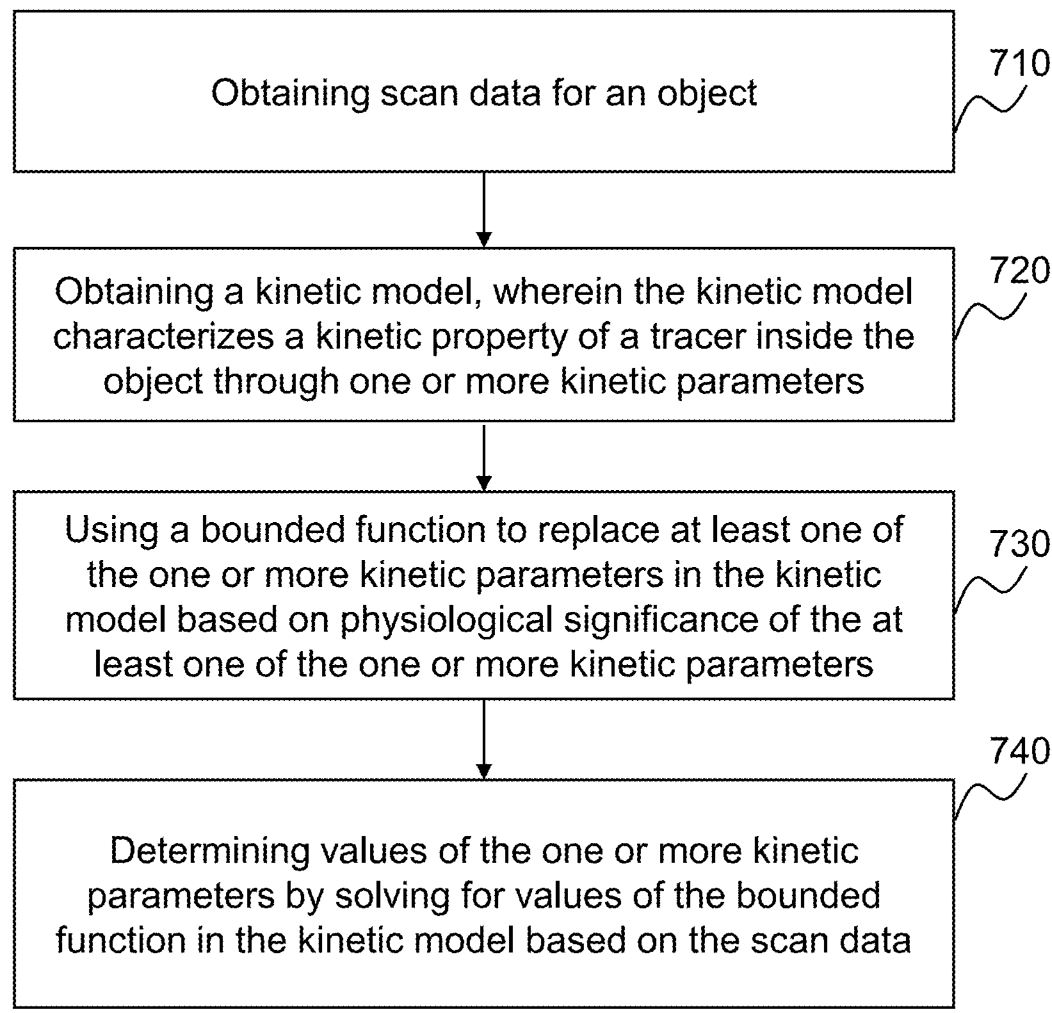
FIG. 7 is a flowchart of an exemplary process for determining one or more kinetic parameters according to some embodiments of the present disclosure.
Figure 8A:
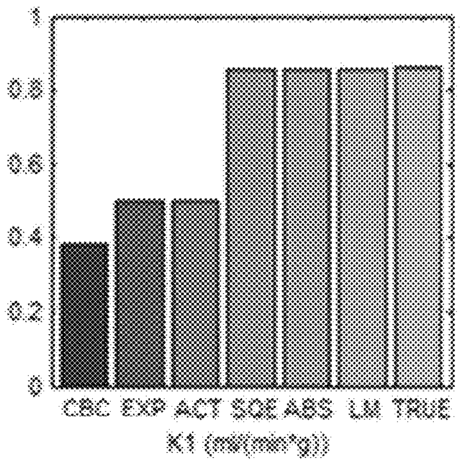
FIGS. 8A-8H are schematic diagrams of simulation test results of calculating a plurality of kinetic parameters using different approaches.
Figure 8B:
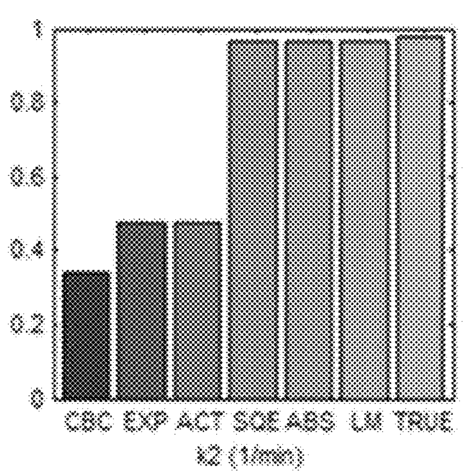
Figure 8C:
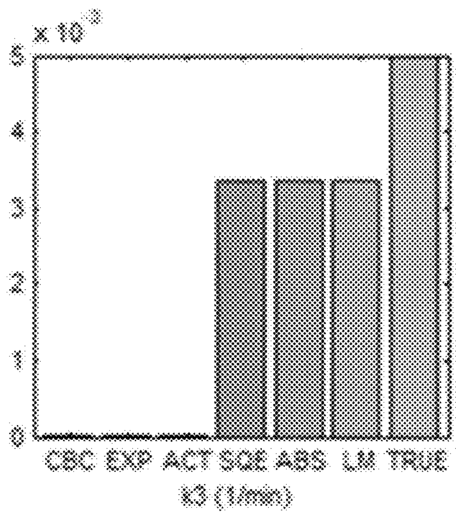
Figure 8D:
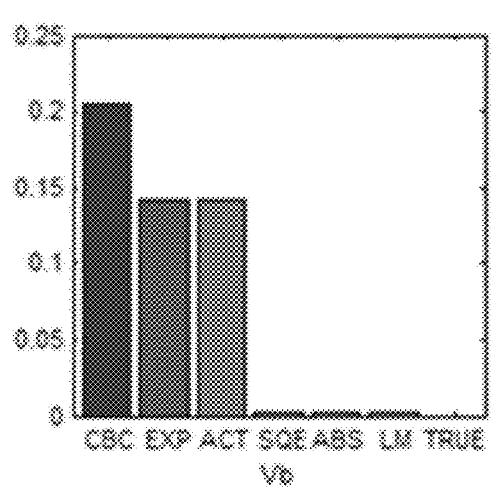
Figure 8E:
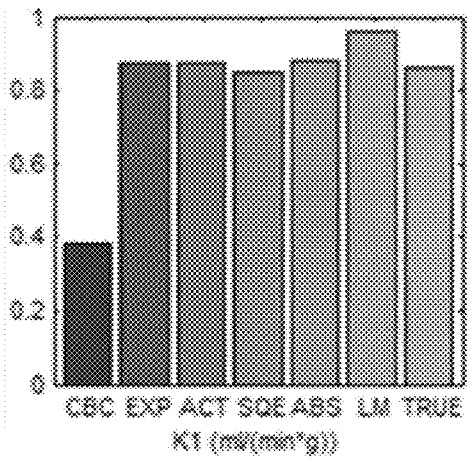
Figure 8F:
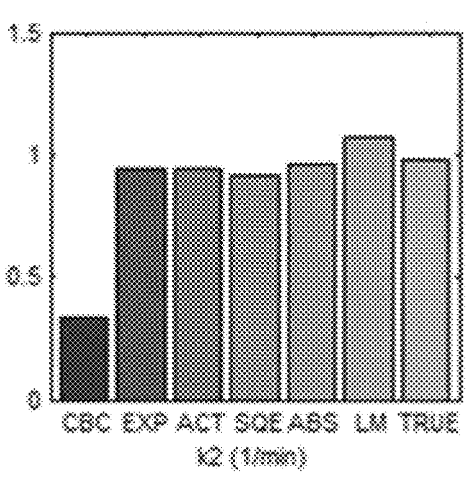
Figure 8G:
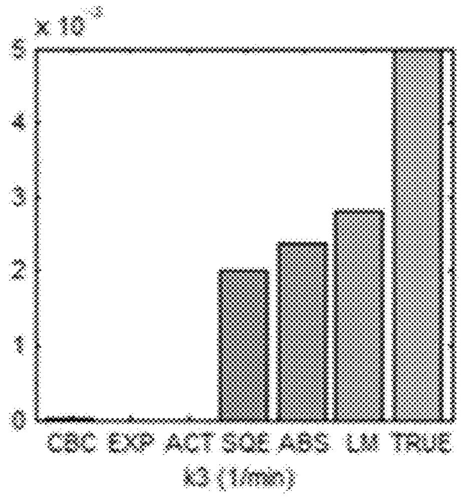
Figure 8H:
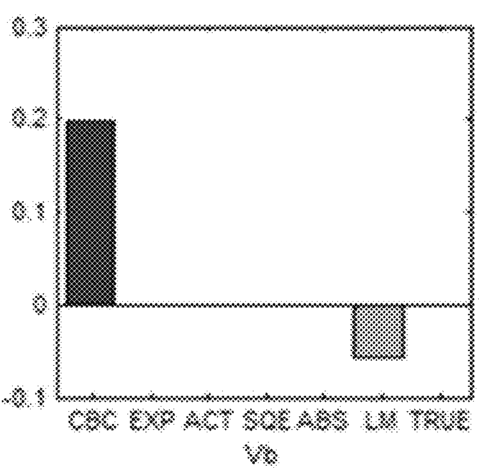

FIG. 7 is a flowchart of an exemplary process for determining one or more kinetic parameters according to some embodiments of the present disclosure. In some embodiments, at least a portion of a process 700 may be executed by the processing device 140 (e.g., implemented in the computing device 200 as shown in FIG. 2). For example, the process 700 may be stored in a form of an instruction (e.g., an application) in a storage device (e.g., the storage device 150, the storage 220, the storage 390) and called and/or executed by the processing device 140 (e.g., the processor 210 as shown in FIG. 2, the CPU 340 as shown in FIG. 3, or one or more modules in the processing device 140 as shown in FIG. 4). Operations of the process described below are for illustrative purposes only. In some embodiments, additional, unspecified operations may be used to complete the process 700. Furthermore, the order of the operations of process 700, as depicted in FIG. 7 and described below, is not intended to be limiting.

In 710, the processing device 140 (e.g., the obtaining module 410) may obtain scan data of an object.

In some embodiments, the scan data may include PET scan data, SPECT scan data, MRI data, CT scan data, etc. In some embodiments, the scan data may be a plurality of sets of PET scan data obtained by dynamic PET imaging on the object. For example, the scan data may be obtained from multi-bed stepwise scanning. As another example, the scan data may be obtained from continuous bed scanning. In some embodiments, the processing device 140 may frame the scan data to obtain a series of frames, which are used to determine the one or more kinetic parameters in 740.

In some embodiments, operation 710 may be executed according to the approach described in 510 in FIG. 5.

In 720, the processing device 140 (e.g., the obtaining module 410) may obtain a kinetic model. The kinetic model characterizes a kinetic property of a tracer inside the object through the one or more kinetic parameters. The one or more kinetic parameters may indicate metabolism information of the tracer inside the object.

In some embodiments, operation 720 may be performed according to the approach described in 530 in FIG. 5 to obtain the kinetic model.

In 730, the processing device 140 (e.g., the processing module 420) may use a bounded function to replace at least one of the one or more kinetic parameters in the kinetic model based on physiological significance of the at least one of the one or more kinetic parameters.

The bounded function refers to a function f(x) defined on an interval E, and for any x within the interval E, there exist constants m and M such that $m \leq f(x) \leq M$. The bounded function may include an absolute value function, a square function, an exponential function, an arctangent function, or any combination thereof.

In some embodiments, the processing device 140 may determine a preset range of the kinetic parameters based on the physiological significance of the at least one of the one or more kinetic parameters. For example, the physiological significance of the kinetic parameter $V_b$ represents the plasma concentration in tissue, which may not be a negative number. Therefore, the preset range of the kinetic parameter $V_b$ is determined to be a numerical value greater than 0. In some embodiments, the processing device 140 may determine the preset range of the kinetic parameters based on at least one of a clinical experiment or empirical data. For example, if a value of a kinetic parameter is within the range [a, b] in numerous clinical experiments, the preset range of the kinetic parameter is set as [a, b].

The processing device 140 may select the bounded functions to replace the kinetic parameters in the kinetic model based on the preset range of the kinetic parameters. For example, the processing device 140 may select an appropriate bounded function based on a characteristic of the appropriate bounded function. For example, the processing device 140 may select an absolute value function (e.g., $|V_b|$) or a square function (e.g., $V_b^2$) to replace the kinetic parameter $V_b$ having non-negative values in the kinetic model.

In some embodiments, the kinetic model may include a plurality of kinetic parameters, and the processing device 140 may select a target kinetic parameter from the plurality of kinetic parameters. The processing device 140 may use the bounded function to replace the target kinetic parameter. The target kinetic parameter may be a parameter that is easily determined to exceed the preset range using a traditional fitting algorithm. The traditional fitting algorithm may include an optimization algorithm (e.g., a Levenberg-Marquardt (LM) algorithm, a gradient descent algorithm, a Newton's algorithm, etc.) that does not employ a boundary constraint. For example, the target kinetic parameter may be a kinetic parameter that is sensitive to noise in an input function (or a time-activity curve (TAC) of the region of interest). In some embodiments, the processing device 140 may select the target kinetic parameter from the plurality of kinetic parameters based on test data or empirical evidence and prioritize the use of the bounded function to replace the target kinetic parameter. According to some embodiments of the present disclosure, in order to improve the accuracy of calculations, the processing device 140 may not use the bounded function to replace the at least one of the one or more kinetic parameters in the kinetic model that are insensitive to noise in the input function. If values of the at least one of the one or more kinetic parameters that are insensitive to noise in the input function, as determined by a current calculation approach, are erroneous (e.g., exceeding the preset range), it is typically considered that the current calculation approach is not suitable or incorrect, and modification is needed.

In some embodiments, the processing device 140 determines values of the plurality of kinetic parameters by solving the kinetic model based on the scan data. For example, the processing device 140 may use the LM algorithm to determine the values of the plurality of kinetic parameters by solving the kinetic model based on the scan data. The processing device 140 may then determine whether there is a value of the plurality of kinetic parameters that exceeds a preset range. For example, each of the plurality of kinetic parameters may correspond to a preset range, and the plurality of kinetic parameters and corresponding preset ranges may be pre-set and stored in the storage device 150. The processing device 140 may obtain the plurality of kinetic parameters and the corresponding preset ranges from the storage device 150. In response to determining that there is a value of the plurality of kinetic parameters that exceeds the preset range, the processing device 140 may use the bounded function to replace the at least one of the one or more kinetic parameters and recalculate values of the plurality of kinetic parameters. In some embodiments, the processing device 140 may again determine whether there is an updated value of the plurality of kinetic parameters that exceeds the preset range. In response to determining that there is an updated value of the plurality of kinetic parameters that exceeds the preset range, the processing device 140 may use the bounded function to replace the at least one of the one or more kinetic parameters and repeat the iterative operation as described above until values (or updated values) of the each of the plurality of the kinetic parameters satisfy the corresponding preset range.

In 740, the processing device 140 (e.g., the determination module 430) may determine the values of the one or more kinetic parameters by solving for values of the bounded function in the kinetic model based on the scan data.

In some embodiments, the processing device 140 may obtain relevant parameters of the kinetic model, for example, the input function, the time-activity curve (TAC) of the region of interest, etc. The processing device 140 may solve for the values of the bounded function in the kinetic model based on the scan data and the relevant parameters of the kinetic model. The processing device 140 may determine the values of the bounded function as the values of the one or more kinetic parameters. In some embodiments, a determination of the one or more kinetic parameters in the kinetic model may be carried out according to the approach described in 530 in FIG. 5.

To further validate the advantages of the bounded function replacement approach proposed in the present disclosure, the TAC of liver tissue is extracted from a PET image of a patient. Kinetic parameter calculations are performed based on a two-compartment model using the traditional LM algorithm, a direct boundary constraint approach, and/or the bounded function replacement approach. A calculation result and goodness of fit ($R^2$) are shown in Table 1. In Table 1, the closer the $R^2$ is to 1, the better the fit result, i.e., the value of the corresponding kinetic parameter is closer to the true value.

TABLE 1

| | $K_1$ ml/(min*g) | $k_2$ (1/min) | $k_3$ (1/min) | $k_4$ (1/min) | $V_b$ | $R^2$ |
|---|---|---|---|---|---|---|
| LM algorithm | 0.5850937 | 0.7766382 | 0.0204981 | 0.0313815 | −0.0076280 | 0.9924 |
| Bounded function replacement approach | 0.58837 | 0.78266 | 0.020600 | 0.031123 | 0 | 0.99250 |
| Direct boundary constraint approach | 0.49440 | 0.58575 | 0.0042376 | −0.018276 | 0 | 0.98536 |

From Table 1, it can be seen that when using the traditional LM algorithm for kinetic parameter calculations, the obtained $V_b$ may be a negative value, which does not conform to the physiological significance. By constraining $V_b$ using the direct boundary constraint approach, although $V_b$ is obtained as 0, the calculated $k_4$ may be negative, which also does not conform to the physiological significance. At the same time, the fitted values of $K_1$, $k_2$, $k_3$, and $k_4$ are significantly different from the values obtained by the traditional LM algorithm with the $R^2$ significantly lower than the LM algorithm. After using the bounded function to replace $V_b$ for nonlinear fitting, while ensuring $V_b$ is non-negative, the fitted values of other kinetic parameters such as $K_1$, $k_2$, $k_3$, and $k_4$ are closer to the fitted values of the kinetic parameters of $K_1$, $k_2$, $k_3$, and $k_4$ obtained using the traditional LM algorithm, with significantly higher $R^2$ compared to the LM algorithm and the direct boundary constraint approach.

It should be noted that the above description in the present disclosure is provided for illustrative purposes only and is not intended to limit the scope of the present disclosure. Those skilled in the art may make various changes and modifications based on the descriptions in the present disclosure. However, these changes and modifications are within the scope of the present disclosure. For example, the process 700 is described using the PET image obtained from the PET device as an example, and the parameter imaging provided in the present disclosure may also be applied to a process of obtaining another type of scan data (e.g., SPECT scan data, MRI data, CT data) from another device (e.g., a SPECT device, a MRI device, a CT device, etc.). In some embodiments, the bounded functions may replace all kinetic parameters in the kinetic model. This can ensure that the values of all calculated kinetic parameters remain within preset reasonable ranges, making computed results more stable and predictable.

FIGS. 8A-8H are schematic diagrams of simulation test results of calculating a plurality of kinetic parameters using different approaches.

In a simulation test, processing device 140 obtains a dataset of a dynamic PET scan of a patient, reconstructed a PET image using a 3D TOF-OSEM algorithm, and determined the TAC based on the PET image. Values of the plurality of kinetic parameters are respectively determined using a common boundary constrained (CBC) approach, an exponential function (EXP) replacement approach, an arctangent function (ACT) replacement approach, a square function (SQE) replacement approach, an absolute value function (ABS) replacement approach, and a traditional LM algorithm based on a two-compartment model. FIGS. 8A-8D show values of $K_1$, $k_2$, $k_3$, and $V_b$ obtained under a condition of noise-free TAC, respectively. FIGS. 8E-8H show values of $K_1$, $k_2$, $k_3$, and $V_b$ obtained under a condition of noisy TAC, respectively.

From FIGS. 8A-8D, it may be seen that under the condition of noise-free TAC, the values of the plurality of kinetic parameters calculated using most of the bounded function replacement approaches (e.g., the SQE replacement approach, the ABS replacement approach) are closer to the true values compared to the CBC approach. The values of the kinetic parameters calculated using the SQE replacement approach and the ABS replacement approach are not significantly different from the values of the plurality of kinetic parameters calculated using the traditional LM algorithm. From FIGS. 8E-8H, it may be seen that under the condition of noisy TAC, the values of the kinetic parameters calculated using most of the bounded function replacement approaches (e.g., the SQE replacement approach, the ABS replacement approach) are also closer to the true values compared to the CBC approach. Especially from FIG. 8H, it may be seen that when using the traditional LM algorithm, the calculated $V_b$ is a negative value, which does not conform to the physiological significance. When using the bounded function replacement approach, the calculated $V_b$ is 0, which is the same as the true value. This indicates that the bounded function replacement approach can at least effectively limit the fitting boundary during the nonlinear fitting and solving process of parameter imaging in the two-compartment model, thereby obtaining the values of the plurality of kinetic parameters that conform to the physiological significance of the plurality of kinetic parameters. Particularly under the condition of noisy TAC, the difference between the values of the plurality of kinetic parameters calculated using the bounded function replacement approach and the values of the plurality of kinetic parameters calculated using the CBC approach is more obvious and the values of plurality of the kinetic parameters calculated using the bounded function replacement approach are closer to the true values. Furthermore, selecting the appropriate type of bounded function replacement approach can improve the accuracy of kinetic parameter calculation.

FIGS. 9A-9D are schematic diagrams of parameter images obtained by calculating a plurality of kinetic parameters using different approaches.

Figures 9A, 9B, 9C, 9D:
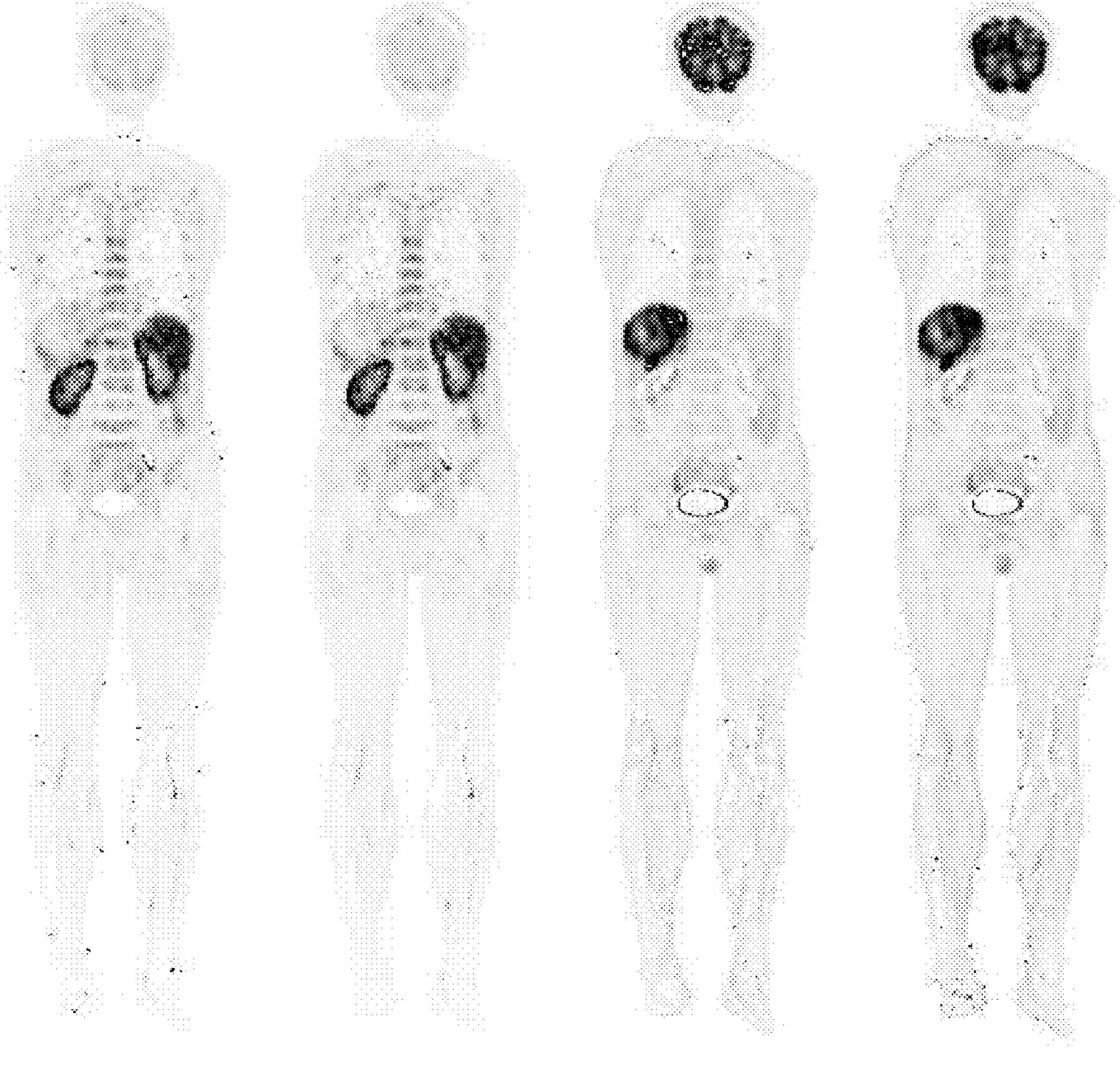
FIGS. 9A-9D are schematic diagrams of parameter images obtained by calculating a plurality of kinetic parameters using different approaches.

As shown, FIG. 9A is a $K_1$ parameter image obtained using the traditional LM algorithm based on a two-compartment model, FIG. 9B is a $K_1$ parameter image obtained using the bounded function replacement approach based on the two-compartment model, FIG. 9C is a Ki parameter image obtained using the traditional LM algorithm based on the two-compartment model, and FIG. 9D is a Ki parameter image obtained using the bounded function replacement approach based on the two-compartment model. From the figures, it may be observed that, compared to the parameter images obtained using the traditional LM algorithm, the parameter images obtained using the bounded function replacement approach have fewer artifacts (e.g., black/white noise points in the brain and lungs). This indicates that, in comparison to the traditional LM algorithm, the parameter images obtained using the bounded function replacement approach exhibit better image quality and higher accuracy.

Figure 10:
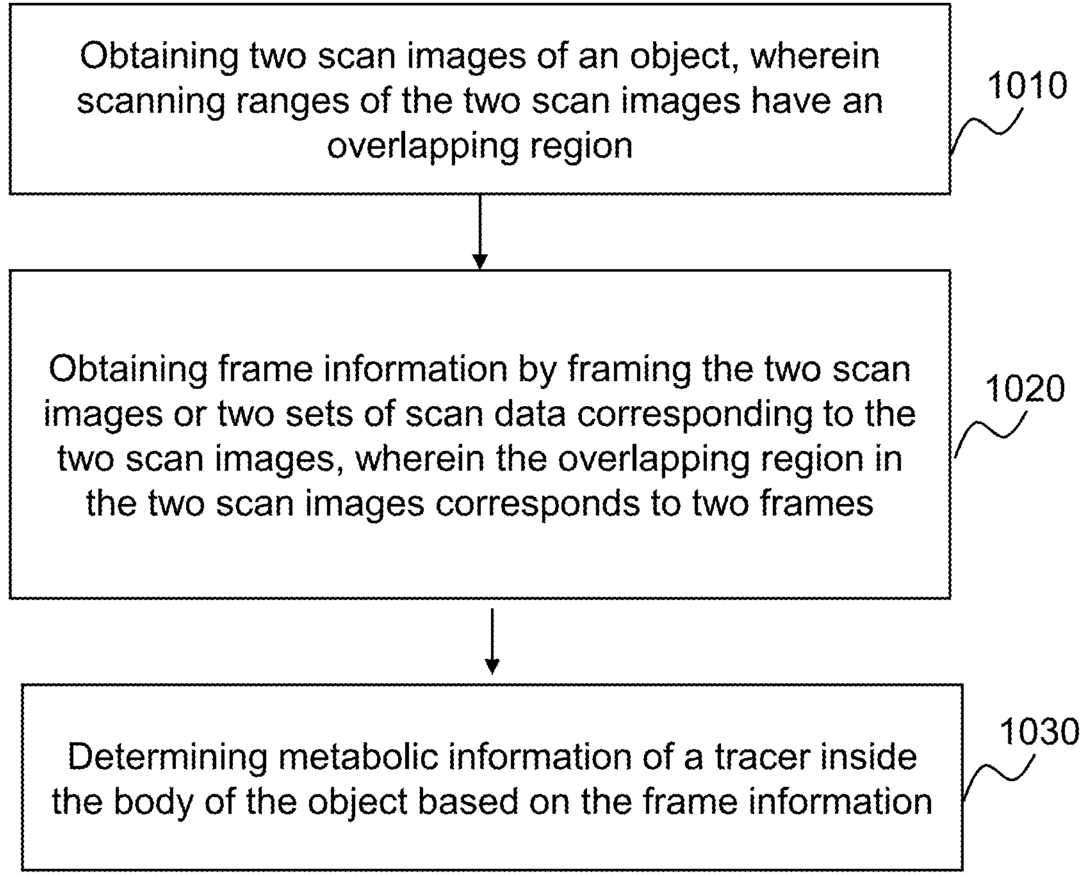
FIG. 10 is a flowchart of an exemplary process for determining metabolism information of a tracer inside an object according to some embodiments of the present disclosure.

FIG. 10 is a flowchart of an exemplary process for determining metabolism information of a tracer inside an object according to some embodiments of the present disclosure. In some embodiments, at least a portion of a process 1000 may be executed by the processing device 140 (e.g., implemented in the computing device 200 as shown in FIG. 2). For example, the process 1000 may be stored in a form of an instruction (e.g., an application) in a storage device (e.g., the storage device 150, the storage 220, the storage 390) and called and/or executed by the processing device 140 (e.g., the processor 210 as shown in FIG. 2, the CPU 340 as shown in FIG. 3, or one or more modules in the processing device 140 as shown in FIG. 4). The operations of the process shown below are for explanatory purposes only. In some embodiments, the process 1000 may be completed using a least one of one or more additional unmentioned operations or one or more operations not discussed. Furthermore, the order of the operations shown in FIG. 10 is not intended to be limiting.

In 1010, the processing device 140 (e.g., the obtaining module 410) may obtain two scan images of an object, and scanning regions of the two scan images have an overlapping region.

In some embodiments, the scan images may include PET images, SPECT images, MRI images, CT images, etc. In some embodiments, the processing device 140 may obtain two sets of scan data and reconstruct the two scan images based on the two sets of scan data. In some embodiments, time information of the two sets of scan data corresponding to the two scan images may be different. For example, a first set of scan data may be obtained by scanning the object with a medical device (e.g., a PET device) from 10:00 to 10:05. A second set of scan data may be obtained by scanning the object with the medical device (e.g., the PET device) from 10:20 to 10:25. In some embodiments, durations of the two scans may be the same or different. There may be a time interval or no time interval between the two scans.

In some embodiments, the processing device 140 may obtain the two sets of scan data by performing scanning on the object at adjacent two bed positions and correspondingly determine the two scan images. More descriptions regarding the multi-bed scan and the overlapping region may be found elsewhere (e.g., FIG. 5 and related description) in the present disclosure.

In 1020, the processing device 140 (e.g., the processing module 420) may obtain frame information by framing the two scan images or the two sets of scan data corresponding to the two scan images. The overlapping region in the two scan images corresponds to two frames.

In some embodiments, the processing device 140 may frame the two scan images. For example, for each scan image of the two scan images, the processing device 140 may divide the each scan image into the overlapping and a non-overlapping region. The processing device 140 may determine a time point corresponding to the overlapping region and a time point corresponding to the non-overlapping region. The processing device 140 may designate a sub-image that corresponds to the overlapping region in the each scan image and the time point corresponding to the overlapping region as information of a frame of the two frames; and designate a sub-image that corresponds to the non-overlapping region in the each scan image and the time point corresponding to the non-overlapping region as information of another frame of the two frames. In some embodiments, the processing device 140 may frame the two sets of scan data corresponding to the two scan images. More descriptions regarding the framing may be found elsewhere (e.g., FIG. 5 and related description) in the present disclosure.

In 1030, the processing device 140 (e.g., the determination module 430) may determine the metabolic information of the tracer inside the object based on the frame information.

More descriptions regarding the determination of the metabolic information of the tracer inside the object based on the frame information may be found elsewhere (e.g., FIG. 5 and related description) in the present disclosure.

It should be noted that the above descriptions in the present disclosure are provided for illustrative purposes only and are not intended to limit the scope of the present disclosure. Those skilled in the art may make various changes and modifications based on the descriptions in the present disclosure. However, these changes and modifications are within the scope of the present disclosure.

The basic concepts have been described above, and it is apparent to those skilled in the art that the foregoing detailed disclosure is intended as an example only and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

At the same time, specific terms are employed to describe the embodiments of the present disclosure. Terms such as "an embodiment," "one embodiment," and/or "some embodiments" are intended to refer to one or more features, structures, or characteristics associated with at least one embodiment of the present disclosure. Thus, it should be emphasized and noted that the terms "an embodiment," "one embodiment," or "an alternative embodiment," mentioned at different locations in the present disclosure two or more times, do not necessarily refer to a same embodiment. Additionally, certain features, structures, or characteristics of one or more embodiments of the present disclosure may be appropriately combined.

Furthermore, those skilled in the art may understand that various aspects of the present disclosure may be explained and described through several categories or situations that may be patentable, including any new and useful processes, machines, combinations of products, or substances, or any new and useful improvements to them. Accordingly, the various aspects of the present disclosure may be entirely executed by hardware, entirely by software (including firmware, resident software, microcode, etc.), or may be executed by a combination of hardware and software. The above hardware or software may be referred to as a “unit,” “module,” or “system.” Furthermore, the various aspects of the present disclosure may be embodied as computer products residing on one or more computer-readable media, which include computer-readable program code.

The computer-readable signal media may include a transmission data signal containing computer program code, for example, on a baseband or as part of a carrier. Such transmission signals may take various forms, including electromagnetic, optical, or any suitable combination. The computer-readable signal media may be any computer-readable medium other than computer-readable storage media, and this medium may be used to connect to an instruction execution system, device, or equipment to facilitate the communication, dissemination, or transmission of the program for use. The program code on computer-readable signal media may be transmitted through any suitable medium, including radio, cables, fiber optic cables, RF, or a combination thereof.

The computer program code required for the operations in the present disclosure may be written in one or more programming languages, including object-oriented programming languages such as Java, Scala, Smalltalk, Eiffel, JADE, Emerald, C++, C#, VB.NET, Python, procedural programming languages like C, VisualBasic, Fortran2103, Perl, COBOL2102, PHP, ABAP, dynamic programming languages like Python, Ruby, Groovy, or other programming languages. The program code may run entirely on a user’s computer or run as an independent software package on a user’s computer or partially run on a user’s computer and partially on a remote computer or server. In the latter case, the remote computer may be connected to the user’s computer via any type of network, including a local area network (LAN) or a wide area network (WAN), or it may establish connections with external computers (e.g., using a network provided by a network service provider) or operate in a cloud computing environment or as a service, for example, a software service (SaaS).

Additionally, unless explicitly stated in the claims, the order of processing elements and sequences, the use of numerical or alphabetical characters, or the use of other names in the present disclosure are not intended to limit the order of the processes and methods. While various examples have been discussed in the disclosure as presently considered useful embodiments of the invention, it should be understood that such details are provided for illustrative purposes only. The appended claims are not limited to the disclosed embodiments, but instead, the claims are intended to cover all modifications and equivalent combinations that fall within the scope and spirit of the present disclosure. For example, although system components described above may be implemented through hardware devices, they may also be implemented solely through software solutions, such as installing the described system on existing processing equipment or mobile devices.

Similarly, it should be noted that, for the sake of simplifying the disclosure of the embodiments of the present disclosure to aid in understanding of one or more embodiments, various features are sometimes grouped together in one embodiment, drawing, or description. However, this manner of disclosure is not to be interpreted as requiring more features than are expressly recited in the claims. In fact, the features of various embodiments may be less than all of the features of a single disclosed embodiment.

Some embodiments use numbers to describe the number of components, and attributes, and it should be understood that such numbers used in the description of the embodiments are modified in some examples by the modifiers “about”, “approximately”, or “generally”. Unless otherwise stated, “about”, “approximately” or “generally” indicates that a variation of ±20% is permitted. Accordingly, in some embodiments, the numerical parameters used in the present disclosure and claims are approximations, which may change depending on the desired characteristics of the individual embodiment. In some embodiments, the numeric parameters should be considered with the specified significant figures and be rounded to a general number of decimal places. Although the numerical domains and parameters configured to confirm the breadth of their ranges in some embodiments of the present disclosure are approximations, in specific embodiments such values are set as precisely as possible within the feasible range.

With respect to each patent, patent application, patent application disclosure, and other material, such as articles, books, manuals, publications, documents, etc., cited in the present disclosure, the entire contents thereof are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

In closing, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A method for parameter imaging, comprising:

obtaining two scan images of an object, wherein each scan image includes a series of frames, the two scan images correspond to adjacent two bed scans, and scanning ranges of the adjacent two bed scans have an overlapping region;

obtaining frame information by framing the two scan images or two sets of scan data corresponding to the two scan images, wherein the overlapping region corresponds to two sub-images in the two scan images, and the two sub-images are divided into two frames; and determining one or more kinetic parameters based on the frame information to directly or indirectly reconstruct a parameter image, wherein the one or more kinetic parameters are related to a determination of metabolic information of a tracer inside the object.

2. The method according to claim 1, wherein the obtaining frame information by framing the two scan images or two sets of scan data corresponding to the two scan images includes:

for each scan image of the two scan images, dividing the each scan image into the overlapping region and a non-overlapping region;

determining a time point corresponding to the overlapping region and a time point corresponding to the non-overlapping region;

designating a sub-image that corresponds to the overlapping region in the each scan image and the time point corresponding to the overlapping region as information of a frame of the two frames; and designating a sub-image that corresponds to the non-overlapping region in the each scan image and the time point corresponding to the non-overlapping region as information of another frame of the two frames.

3. The method according to claim 1, wherein the frame information further includes weights of the two frames corresponding to the overlapping region in the two scan images, and the two scan images includes a first scan image and a second scan image, and obtaining the frame information includes:

determining the weight of a first frame corresponding to the overlapping region in the first scan image based on position information of the overlapping region in the first scan image; and determining the weight of a second frame corresponding to the overlapping region in the second scan image based on position information of the overlapping region in the second scan image.

4. The method according to claim 3, wherein the weights are expressed by a weight matrix, and each weight value in the weight matrix corresponds to a pixel in a corresponding frame of the overlapping region.

5. The method according to claim 4, wherein the weight value in the weight matrix is related to:

a distance along a direction of movement of a scanning bed between the pixel in the corresponding frame of the overlapping region and a central position of a scanning device.

6. The method according to claim 1, wherein the determining one or more kinetic parameters based on the frame information includes:

determining values of the one or more kinetic parameters using a weighted iterative algorithm based on the frame information and a kinetic model.

7. The method according to claim 6, wherein the determining values of the one or more kinetic parameters using a weighted iterative algorithm based on the frame information and a kinetic model includes:

determining the values of the one or more kinetic parameters using a weighted expectation-maximization algorithm based on the frame information and the kinetic model.

8. The method according to claim 6, wherein the kinetic model includes a compartmental model or a retention model.

9. The method according to claim 1, wherein the determining one or more kinetic parameters based on the frame information includes:

using a bounded function to replace at least one of the one or more kinetic parameters in a kinetic model based on physiological significance of the at least one of the one or more kinetic parameters; and determining values of the one or more kinetic parameters by solving for values of the bounded function in the kinetic model.

10. The method according to claim 1, wherein a portion of a first scan image of the two scan images corresponding to the overlapping region is a first sub-image;

a portion of a second scan image of the two scan images corresponding to the overlapping region is a second sub-image;

the first sub-image and the second sub-image are designated as the two frames;

a first time point is assigned to the first sub-image; and a second time point different from the first time point is assigned to the second sub-image.

11. The method according to claim 10, wherein the first time point is determined based on a start scan time and an end scan time of the first scan image; and the second time point is determined based on a start scan time and an end scan time of the second scan image.

12. The method according to claim 11, wherein the first time point is a midpoint of the start scan time and the end scan time of the first scan image; and the second time point is a midpoint of the start scan time and the end scan time of the second scan image.

13. The method according to claim 12, wherein a portion of the first scan image corresponding to a non-overlapping region of the first scan image is a third sub-image;

a portion of the second scan image corresponding to a non-overlapping region of the second scan image is a fourth sub-image;

the first time point is assigned to the third sub-image; and the second time point is assigned to the fourth sub-image.

14. The method according to claim 5, wherein the further a physical point of the object corresponding to the pixel in the corresponding frame is from the central position of the scanning device, the smaller a weight value corresponding to the pixel.

15. A method for parameter imaging, comprising:

obtaining two sets of scan data of an object by performing scanning on the object at adjacent two bed positions, wherein scanning ranges of the adjacent two bed positions have an overlapping region;

obtaining frame information by framing the two sets of scan data or two scan images, wherein the overlapping region corresponds to two sub-images in the two scan images, and the two sub-images are designated as two frames; and determining one or more kinetic parameters based on the frame information to directly or indirectly reconstruct a parameter image, wherein the one or more kinetic parameters are related to a determination of metabolic information of a tracer inside the object.

16. A method for parameter imaging, comprising:

obtaining scan data of an object;

obtaining a kinetic model, wherein the kinetic model characterizes a kinetic property of a tracer inside the object through one or more kinetic parameters, and the one or more kinetic parameters indicate metabolic information of the tracer inside the object;

using a bounded function to replace at least one of the one or more kinetic parameters in the kinetic model based on physiological significance of the at least one of the one or more kinetic parameters; and determining values of the one or more kinetic parameters by solving for values of the bounded function in the kinetic model based on the scan data.

17. The method according to claim 16, wherein the using a bounded function to replace at least one of the one or more kinetic parameters in the kinetic model based on physiological significance of the at least one of the one or more kinetic parameters includes:

determining a preset range of the at least one of the one or more kinetic parameters based on the physiological significance of the at least one of the one or more kinetic parameters; and selecting, based on the preset range, the bounded function for replacing the at least one of the one or more kinetic parameters in the kinetic model.

18. The method according to claim 16, wherein the one or more kinetic parameters includes a plurality of kinetic parameters, and the using a bounded function to replace at least one of the one or more kinetic parameters in the kinetic model based on physiological significance of the at least one of the one or more kinetic parameters includes:

selecting a target kinetic parameter from the plurality of kinetic parameters; and using the bounded function to replace the target kinetic parameter.

19. The method according to claim 16, wherein the one or more kinetic parameters includes a plurality of kinetic parameters, and the using a bounded function to replace the at least one of the one or more kinetic parameters in the kinetic model based on physiological significance of the at least one of the one or more kinetic parameters includes:

determining values of the plurality of kinetic parameters by solving the kinetic model based on the scan data;

determining if there is a value of the plurality of kinetic parameters that exceeds a preset range; and in response to determining that there is the value of the plurality of kinetic parameters that exceeds the preset range, using the bounded function to replace the at least one of the one or more kinetic parameters.

20. The method according to claim 16, wherein the determining values of the one or more kinetic parameters by solving for values of the bounded function in the kinetic model based on the scan data includes:

determining a value of the bounded function in the kinetic model using a fitting algorithm based on the scan data; and designating the value of the bounded functions as the value of the at least one of the one or more kinetic parameters.

* * * * *